July 12, 1960 G. H. TABER 2,944,832
RUNNING GEAR AND SPRING SUSPENSION FOR MOTOR VEHICLES
Filed June 14, 1957 9 Sheets-Sheet 1

INVENTOR.
George H. Taber

ATTORNEYS

July 12, 1960

G. H. TABER 2,944,832

RUNNING GEAR AND SPRING SUSPENSION FOR MOTOR VEHICLES

Filed June 14, 1957

INVENTOR.
George H. Taber

BY
Shoemaker & Mattare

ATTORNEYS

July 12, 1960     G. H. TABER     2,944,832
RUNNING GEAR AND SPRING SUSPENSION FOR MOTOR VEHICLES
Filed June 14, 1957     9 Sheets-Sheet 3

INVENTOR.
George H. Taber
BY
Shoemaker & Mattare
ATTORNEYS

July 12, 1960 G. H. TABER 2,944,832
RUNNING GEAR AND SPRING SUSPENSION FOR MOTOR VEHICLES
Filed June 14, 1957 9 Sheets-Sheet 4

INVENTOR.
George H. Taber
BY
Shoemaker & Mattare
ATTORNEYS

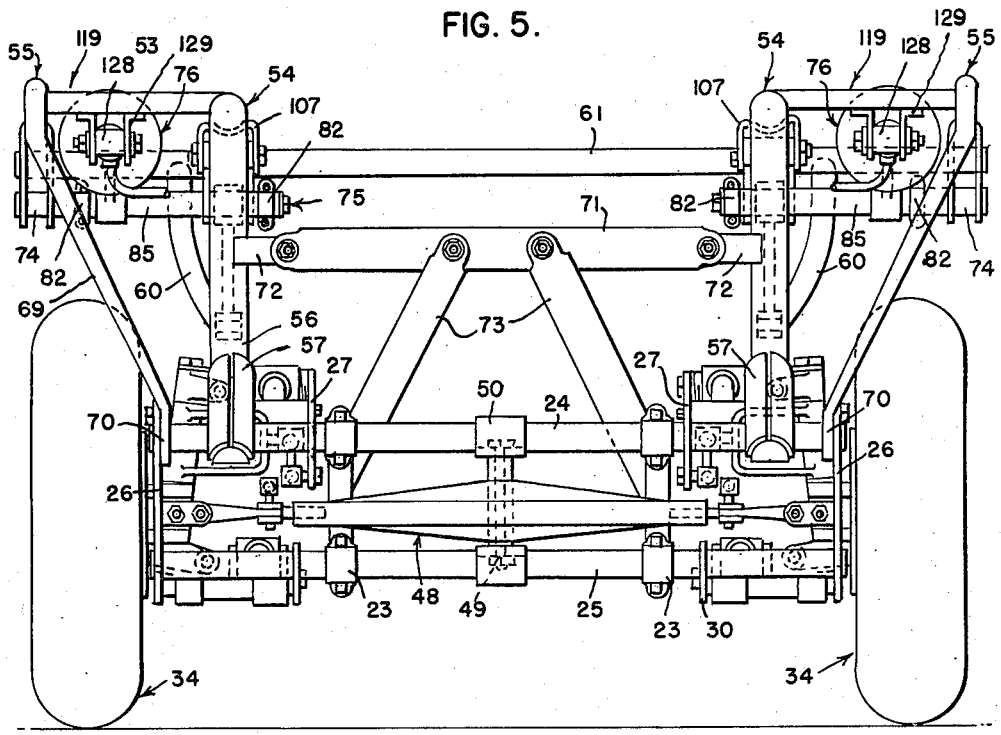
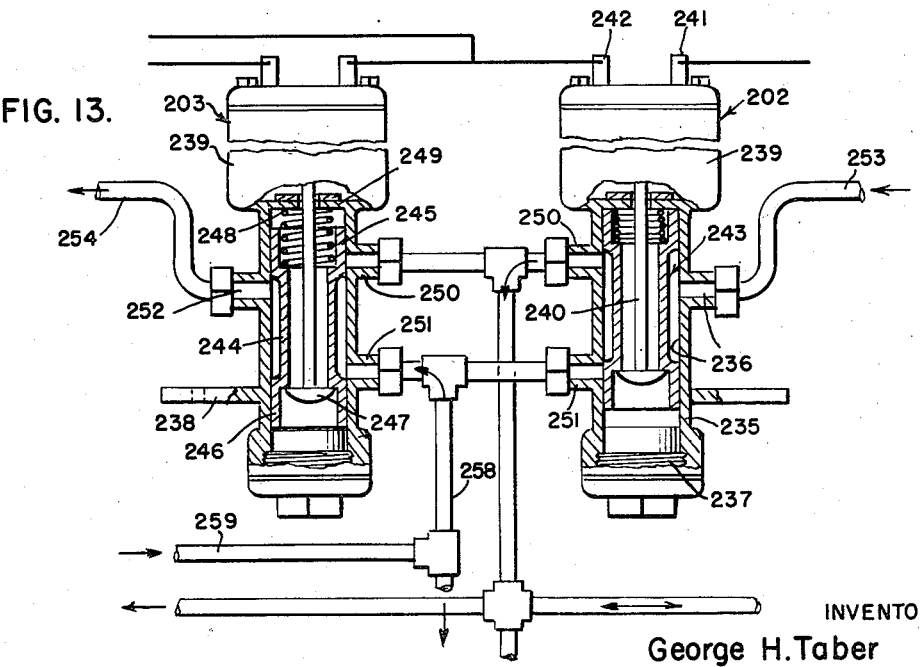

July 12, 1960 G. H. TABER 2,944,832
RUNNING GEAR AND SPRING SUSPENSION FOR MOTOR VEHICLES
Filed June 14, 1957 9 Sheets-Sheet 6
FIG. 10.
FIG. 9.
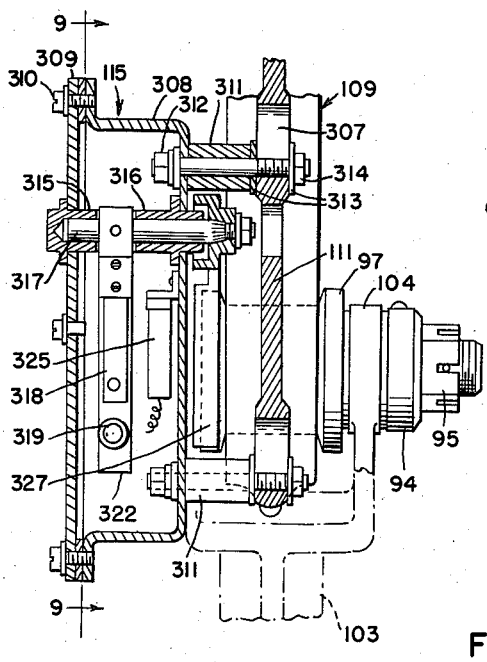
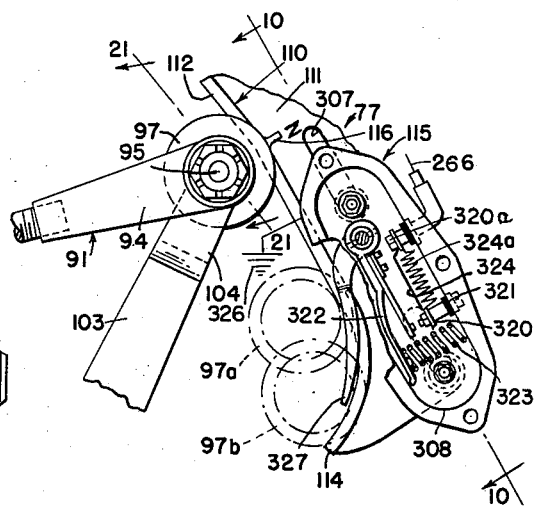
FIG. 8.
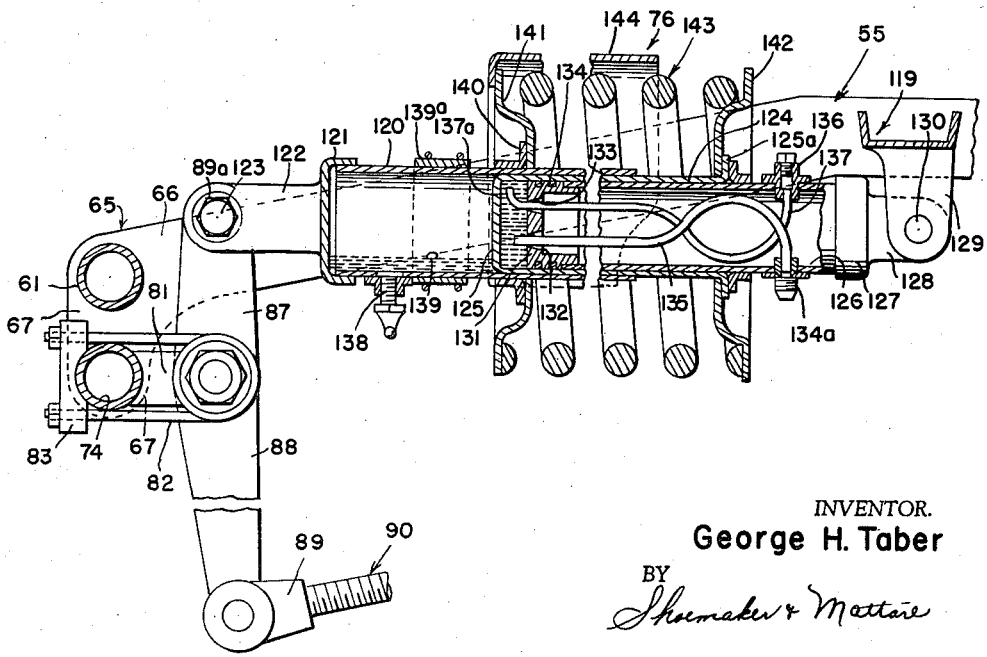
INVENTOR.
George H. Taber
BY
Shoemaker & Mattare
ATTORNEYS July 12, 1960 G. H. TABER 2,944,832
RUNNING GEAR AND SPRING SUSPENSION FOR MOTOR VEHICLES
Filed June 14, 1957 9 Sheets-Sheet 7

INVENTOR.
George H. Taber
BY
Shoemaker & Mattare
ATTORNEYS

July 12, 1960 G. H. TABER 2,944,832
RUNNING GEAR AND SPRING SUSPENSION FOR MOTOR VEHICLES
Filed June 14, 1957 9 Sheets-Sheet 8
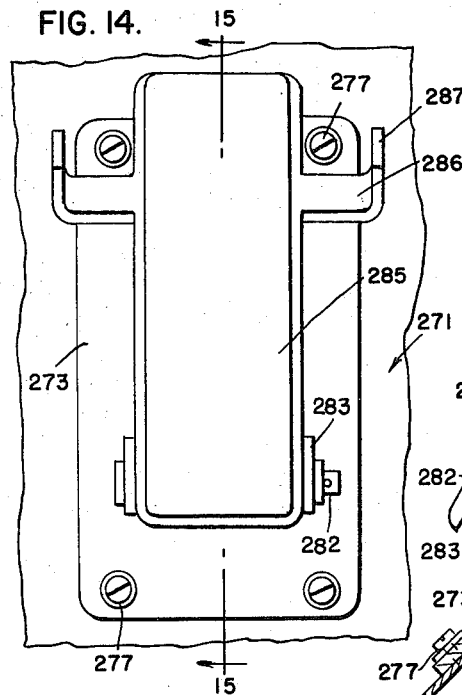
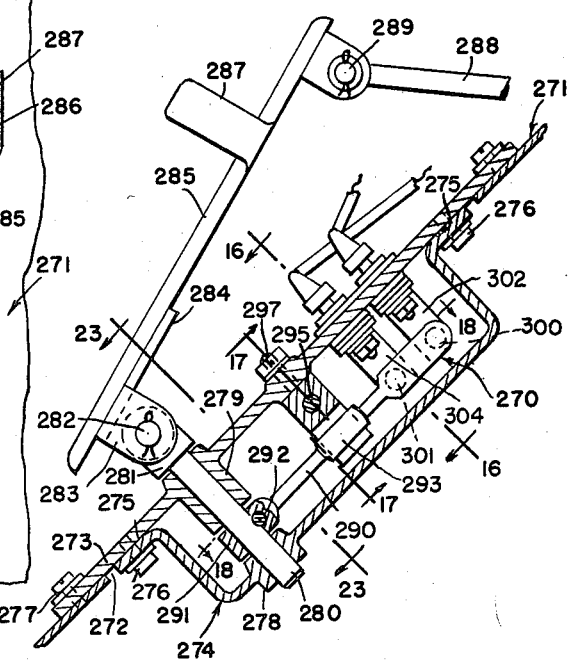
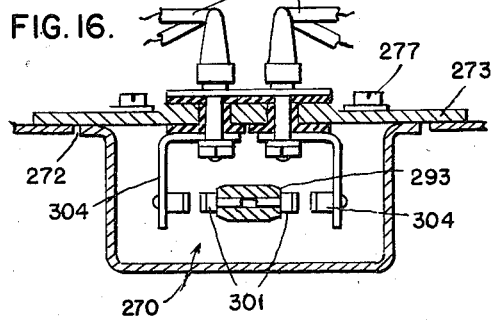
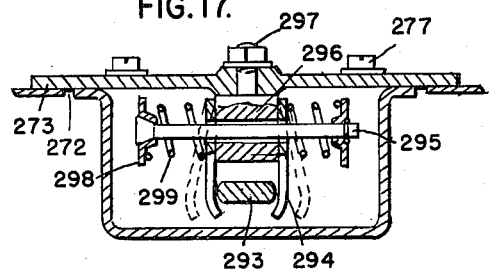
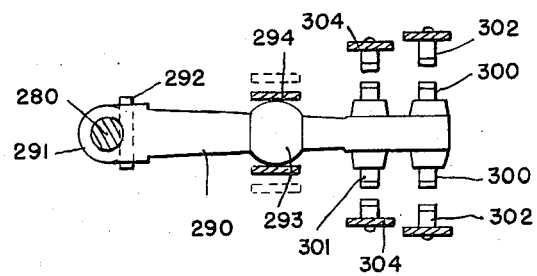
INVENTOR.
George H. Taber
BY
*Shoemaker & Mattare*
ATTORNEYS July 12, 1960 G. H. TABER 2,944,832
RUNNING GEAR AND SPRING SUSPENSION FOR MOTOR VEHICLES
Filed June 14, 1957

INVENTOR.
George H. Taber
BY
ATTORNEYS

United States Patent Office 2,944,832
Patented July 12, 1960

2,944,832

RUNNING GEAR AND SPRING SUSPENSION FOR MOTOR VEHICLES

George H. Taber, 762 E. Water St., Elmira, N.Y.

Filed June 14, 1957, Ser. No. 665,784

29 Claims. (Cl. 280—124)

This invention relates generally to improvements in the running gear for motor vehicles, particularly, but not exclusivley, to passenger vehicles, and the term "running gear" here employed contemplates both the spring suspension mechanism and the steering mechanism for the vehicle, which spring suspension and steering mechanisms are particularly designed for cooperative operation or action to jointly contribute to the attainment of the several objects hereinafter particularly pointed out.

The present invention is based broadly upon the disclosures of my prior applications Serial No. 432,356, filed May 26, 1954, and now Patent 2,907,578; Serial No. 504,807, filed April 29, 1955, and now Patent 2,904,343; and Serial No. 591,449, filed June 6, 1956, and now Patent 2,913,253.

As pointed out in the applications above referred to, motor vehicles generally, and particularly pleasure cars of current body styling, have reduced the spacing between the body frame members and the roadway surface to such an extent that the amount of what is known as the "jounce" space between the running gear members and the adjacent or underlying parts of the body and chassis frame, is insufficient to properly provide for the best riding and steering conditions of the vehicle, this space, in substantially all makes of cars, being in the neighborhood of 2½ inches. Between the rear axle housing of the vehicle and the body support frame this space is slightly greater but is still small as it is only about 6 inches. Accordingly, in the use of coil springs in the conventional four locations for the vehicle springs, for body support or suspension, the rate of such springs must be high to support body loads in order to prevent the body frame from riding on the rubber bumpers which are interposed between the running gear and the body frame members.

With such reduced jounce space between the running gear and the body structure at the front and rear of the vehicle and the necessity of providing conventional springs of high strength or high spring rate, even though such coil springs are free from any frictional snubbing action such as may be found in leaf spring constructions, the high spring rate necessary or required to compensate for passenger overloads results in powerful spring rebound action when the vehicle wheels ride over a rise in the road or drop into a depression, which consequently requires recoil snubbers of sufficient snubability to snub or retard the rebound energy momentarily stored or built up in the resilient suspension elements.

The character of currently used spring recoil snubbers, whether of the hydraulic or the strap types, is such that upon the commencement of rebound, they momentarily quite rigidly tie in the body with the running gear and reduce or destroy the suspension flexibility of the suspension mechanism and this is particularly emphasized in zero weather.

Also, because of the present location of the resilient support means for a vehicle body being too far below the body center of gravity, upon the making of a steering turn, particularly where the vehicle is traveling at a relatively high rate of speed, inertia of the entire car body and the passenger load causes the car body to tend to follow a straight line of travel, thereby producing a contrary transverse inclination of the car body which produces in the steerable wheels of an independent wheel suspension structure, a powerful tractional steering urge contrary to the wheel axis camber and opposing that required for the intended steering direction.

The present invention has for its objects broadly to not only eliminate, or at least reduce to a considerable degree, the undesirable conditions above set forth associated with present or known motor vehicle suspension systems, in the manner and by the means disclosed in my prior applications, but to provide a number of improvements and refinements of the mechanism of a character or form patentably distinct from the structures of the prior applications by means of which the elimination of the stated undesirable conditions is effected in a greatly improved and more efficient manner.

Another object of the invention is to provide a selective push button control system by means of which either of two states of resilient riding suspension and steering conditions may be had.

It is another object of the invention to provide a novel control means associated with the foot accelerator pedal of the motor vehicle by means of which, when the vehicle body is in an elevated state with respect to the running gear, the transverse inclination of the vehicle body to the right or to the left can be rapidly effected for the purpose of relating the steerable wheel camber axis to the direction of steering at a desired or proper moment prior to the making of a steering turn.

In my prior Patent 2,913,253 the spring suspension disclosed embodies a horizontally disposed spring adjacent to, above and inwardly of each of the wheels of the vehicle structure, with fluid pressure means for changing the spring rate and for effecting the elevation of the vehicle body above the running gear, the elevation mechanism embodying thrust cams connected with the vehicle body and in alignment with the horizontally disposed springs and the fluid pressure mechanism associated with each spring. An object of the present invention is to provide a new and novel supporting means for such horizontally disposed suspension springs and thrust cam by means of which the body structure may be elevated, in which the springs and thrust cams are disposed in such a position as to provide for a greater amount of under hood space and also to make possible employment of shorter springs at the front end of the vehicle without sacrificing any of the desirable features associated with the structures of the preceding applications.

Still another object of the invention is to provide a novel positioning and manner of supporting the hydraulic body elevating units in such locations that the units at the forward end of the vehicle will be disposed above the center of gravity of the car body and the units at the rear of the vehicle will be located below the center of gravity of the car body to counterbalance the forward units and to substantially cancel any contrary inertia effects resulting from the location of the front body elevating unit above the car body center of gravity.

Persons skilled in the automotive art are aware that in the steering of the motor vehicle along a curved path, as when rounding a turn, a rolling motion is imparted to the vehicle which results in a tendency of the rear wheels to steer away from the straight line which the vehicle has been traveling and in a direction contrary to the direction of steering of the front wheels. It is accordingly an object of the present invention to provide front and rear wheel suspensions which are related in a new and novel manner, whereby this tendency for the rear wheels to take a direction of movement contrary to that of the steerable front wheels is reduced or overcome, thus improving the steerability of the vehicle.

Another object of the invention is to provide, in a manner as hereinafter set forth, a means whereby steering knuckle members of the steerable wheels of an automotive vehicle in a so-called independent wheel suspension system, resiliently support the vehicle body through the medium of an adjustable cam interposed between such knuckle members and a horizontally disposed coil spring which is laterally offset with respect to the cam, the rate of which spring can be varied by tiltingly adjusting the cam with respect to a follower engaged thereon and which is urged thereagainst by the spring.

Another object of the invention is to provide in addition to the foregoing, a fluid pressure means for applying thrust to the cam associated with each suspension spring to elevate the vehicle body and also lower the rate of the spring, with electric solenoid controlled valves for effecting the release of fluid from the fluid pressure means for applying thrust to the cam associated with each suspension spring and with a control switch carried by each cam for grounding and energizing the solenoid controlling the valve of the associated fluid pressure means.

Still another object of the invention is to provide in addition to the structure set forth in the preceding paragraph, a novel mounting for the grounding switch carried by each of the cams whereby such switch can have its position adjusted within certain limits on the supporting cam to advance or retard its actuation by the adjacent thrust applying means.

Still another object of the invention is to provide in association with each of the cam carried solenoid grounding switches a means for maintaining a desired temperature around the cam carried switch whereby to assure effective operation of the switch in zero weather.

Still another object of the present invention is to provide in a fluid system of the character stated associated with an independent four-wheel spring suspension mechanism and fluid pressure operated means for elevating the vehicle body relative to the running gear, a novel single outlet hydraulic pressure pump for delivering fluid to the fluid pressure means associated with each wheel suspension, having an electric solenoid controlled valve for cutting the pump into and out of operation in the system.

Other objects and advantages of the invention will become apparent as the description of the same proceeds, and the invention will be best understood from a consideration of the following detail description taken in connection with the accompanying drawings forming part of the specification, with the understanding, however, that the invention is not confined to a strict conformity with the showing of the drawing but may be changed or modified so long as such changes or modifications mark no material departure from the salient features of the invention as expressed in the appended claims.

In the drawings:

Fig. 5 is a front elevational view of the structure shown in Fig. 1;

Fig. 6 is a view in top plan and on an enlarged scale of one of the hydraulic units showing the connection between the unit and an overlying portion of the frame structure at the front of the unit and between the rear end portion of the unit and the underlying running gear;

Fig. 7 is a sectional detail on an enlarged scale taken approximately on the line 7—7 of Fig. 6;

Fig. 8 is a sectional view on an enlarged scale taken approximately on the line 8—8 of Fig. 6, illustrating the means for introducing fluid under pressure into the hydraulic unit cylinder and the means for bleeding air from the cylinder to facilitate completely filling the latter with the fluid;

Fig. 9 is a view in side elevation and on an enlarged scale of a cam switch, a portion of the supporting cam and a portion of the support arm and thrust link, the switch housing cover being removed to show details of construction and illustrating in dotted outline the positions to which the follower roller may move to effect closing of the switch;

Fig. 10 is a sectional view on an enlarged scale taken approximately on the line 10—10 of Fig. 9;

Figure 24:
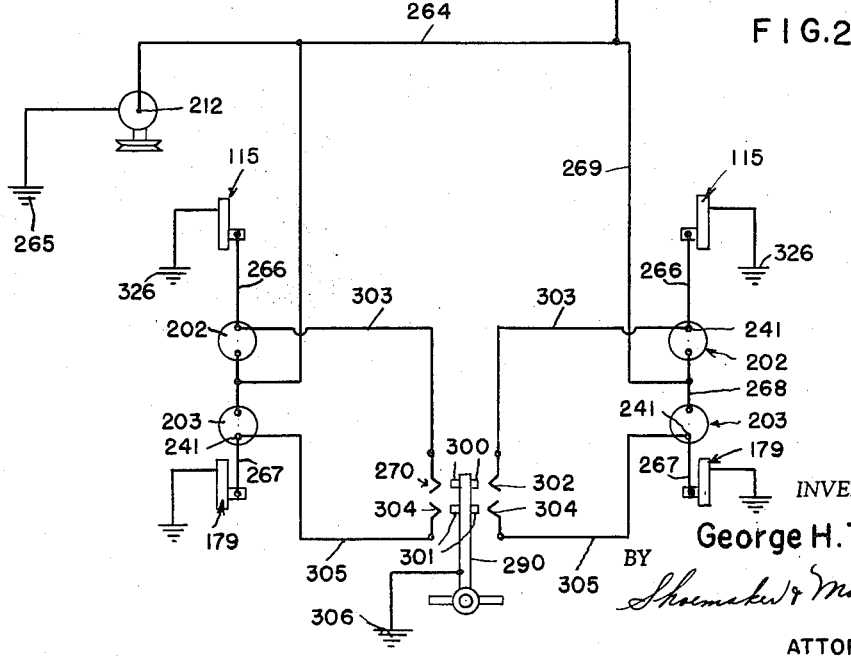
Figure 21:
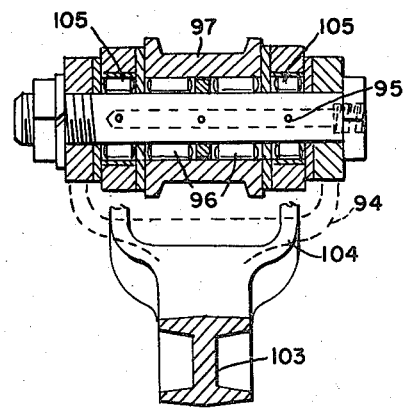
Figure 20:
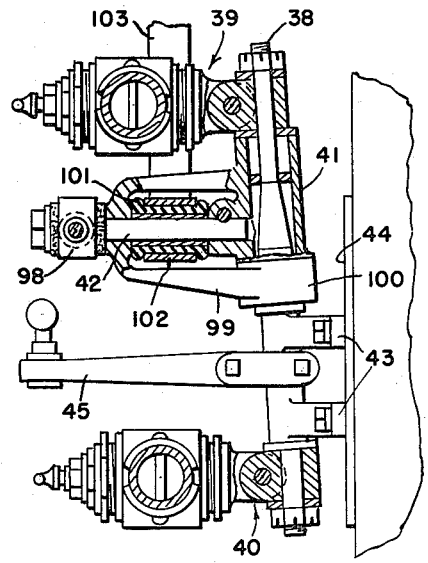
Figure 19:
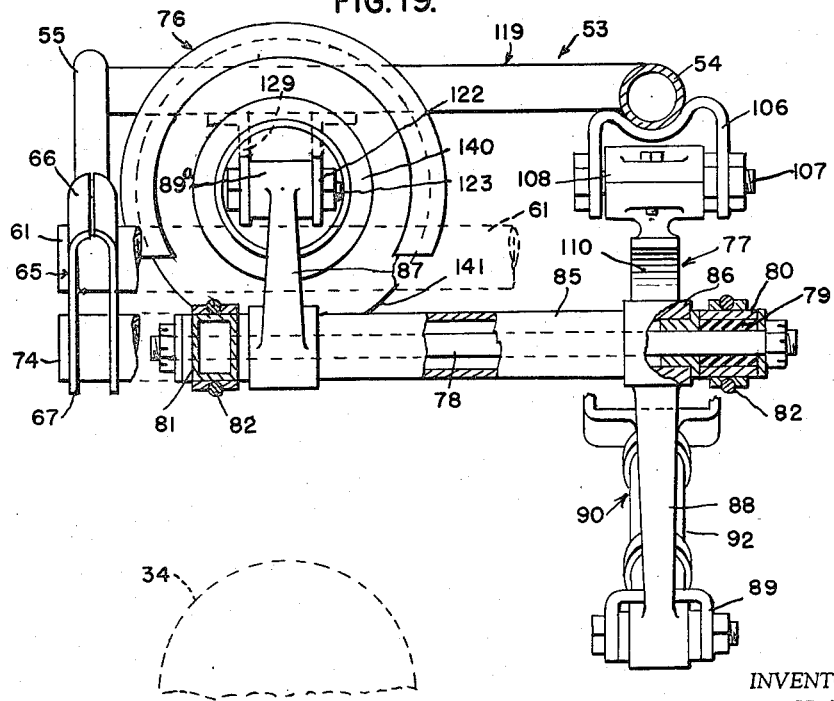

Fig. 13 is a view on an enlarged scale, partly in elevation and partly in section, of a pair of electromagnetically controlled valves which are associated with an adjacent pair of front and rear elevating units and also showing, in addition to portions of connecting conduits, the valve associated with the adjacent front hydraulic unit opened by reason of the energization of the control electromagnet to permit the adjacent front unit to drain and the valve associated with the adjacent rear hydraulic unit set to pass fluid under pressure to such rear unit;

Fig. 14 illustrates in plan the modified foot accelerator pedal by which actuation of the foot controlled switches is effected for selectively simultaneously energizing a pair of the electro-magnets at the sides of the structure;

Fig. 15 is a longitudinal section taken approximately on the line 15—15 of Fig. 14, but showing the accelerator pedal in side elevation;

Fig. 16 is a sectional view taken approximately on the line 16—16 of Fig. 15;

Fig. 17 is a sectional view taken approximately on the 17—17 of Fig. 15;

Fig. 18 is a sectional view taken approximately on the line 18—18 of Fig. 15;

Fig. 19 is a detail view partly in section and partly in elevation of a hydraulic elevating and spring suspension unit as viewed from the rear, the inner body support tube being in transverse section;

Fig. 20 is an enlarged detail view partly in elevation and partly in section, showing the steering spindle bolt for one wheel and adjacent elements particularly illustrating the mounting of a body support arm;

Fig. 21 is a sectional view taken approximately on the line 21—21 of Fig. 9;

Fig. 22 is an enlarged detail of the valve mechanism associated with the pump and by-pass unit;

Fig. 23 is a sectional view taken approximately on the line 23—23 of Fig. 15;

Fig. 24 is a view illustrating the circuit diagram for the electrical units of the apparatus.

Figure 1:
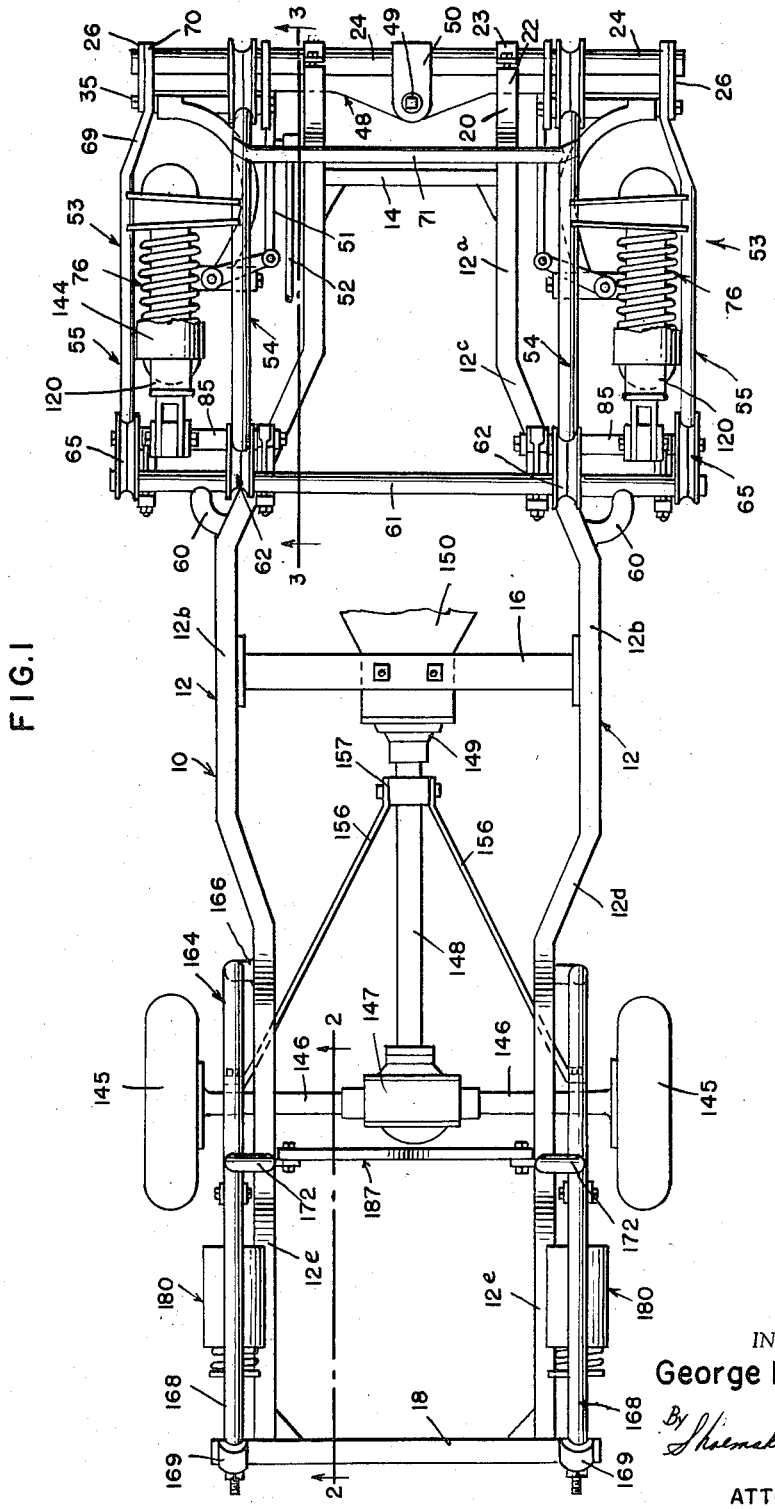
Fig. 1 is a view in top plan of a motor vehicle chassis frame and vehicle running gear showing the elements of the present invention on the chassis frame and connecting the same with the running gear, the fluid conduit system and electrical system being omitted for clarity.

Referring now more particularly to the drawings, wherein like numerals of reference indicate corresponding parts throughout the several views, in Fig. 1, in which the top plan view of the chassis frame and underlying running gear are shown, the numeral 10 generally designates the frame which comprises the two longitudinal side beams 12 which may be of any suitable cross sectional form, while the numerals 14, 16 and 18 designate, respectively, forward, intermediate and rear transverse beams which are rigidly coupled to the side beams 12 in conventional manner. Each of the side beams 12 at its forward end is formed to provide a fork having the vertically spaced forwardly extending arms 20, each of which arms at its forward end is formed with a semi-circular recess or socket 22 cooperating with a cap 23 to secure the hereinafter described transverse front end elements, which elements in turn support a part of the steering mechanism as hereinafter set forth.

The chassis frame is of major width intermediate its ends, as shown, by forming each of the side beams 12 with the long forward end section 12a and an intermediate or middle section 12b joined to the sections 12a by the obliquely extending sections 12c. The rear ends of the outwardly spaced intermediate sections 12b are joined by the inwardly and rearwardly extending sections 12d which in turn join long terminal rear sections 12e.

The forward end sections are in parallel relation and are parallel with the rear end sections 12e but are set somewhat closer together than the rear end sections, as shown.

The front cross beam 14 serves as a motor or engine support and the forks of the side beams are disposed ahead of this cross beam 14 and extending transversely of the front end of the chassis frame and secured thereto and forming a rigid part thereof are the upper and lower transverse tubular beams 24 and 25, respectively, which are positioned in the sockets or recesses 22 of the upper and lower ends of the fork arms and secured in place by the caps 23 which are bolted to the fork arms.

The rigid cross beams 24 and 25 extend a substantial distance outwardly beyond the adjacent longitudinal side beams of the frame and at their outer ends these upper and lower cross beams are rigidly secured together by the vertical connector plates 26 and inwardly from each of these connector plates and adjacent to the outer side of each of the upper fork arms 20 the upper beam 24 carries a forked plate 27 having the rearwardly extending upper and lower forks 28 and 29, respectively, while the lower beam 25 carries or has secured thereto below and slightly outwardly with respect to the plate 27, a plate 30 which has a rearwardly extending portion 31.

At each side of the forward end of the vehicle chassis frame and operatively coupled with the upper and lower transverse beams 24 and 25, are two rearwardly extending vertically spaced wheel tractor arms.

Figure 3:
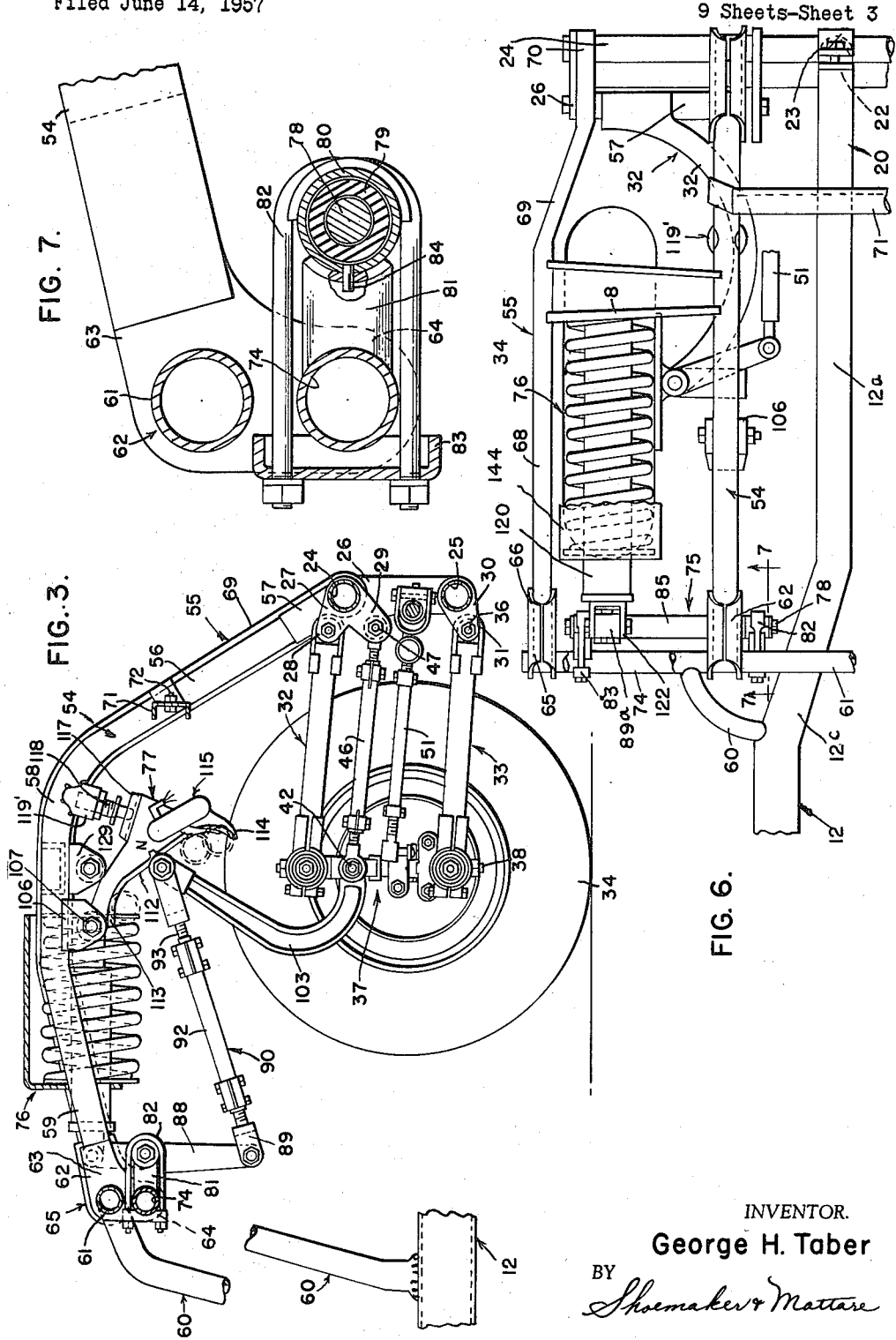
Fig. 3 is a longitudinal sectional view in which the section is taken in a vertical plane through the front end portion of the structure shown in Fig. 1, approximately on the line 3—3 of Fig. 1 and on an enlarged scale, with the front end portion of one side beam of the chassis omitted for clarity, a portion only of such side beam being shown to illustrate a vertical support.

As will be apparent upon reference to Fig. 3, the upper one of the two arms is generally designated 32 while the lower arm is generally designated 33, and, as will be seen upon reference to Figs. 1 and 6, where the top one of the two arms is shown, and which arm is formed like each of the others, the arm is bowed inwardly toward the chassis frame from its forward end and terminates in a straight rear portion which is connected with an end of the spindle bolt of the adjacent steerable front wheel, generally designated 34. These wheel tractor arms 32 and 33 at the two sides of the chassis are particularly illustrated and described in my copending application Ser. No. 591,449, filed June 14, 1956, and accordingly it is not believed necessary to illustrate and describe the detail features of these arms in the present application. It is pointed out, however, that the forward end of each upper arm 32 is supported upon a pivot bolt 35 for vertical swinging movement on a transverse axis and which bolt is mounted between a portion of the upper end of the adjacent side plate 26 and the ear 28 of the adjacent plate 27.

The lower arm 33 at each side of the chassis frame is likewise supported for vertical swinging on an axis extending transversely of the chassis and parallel with and directly beneath the adjacent pivot bolt 35 on a similar pivot bolt 36 which is connected at one end with a lower end portion of the adjacent plate 26 and has its other or inner end connected to the rearward extension 31 of the adjacent plate 30.

These two arms 32 and 33 at each side of the chassis frame form a parallelogram structure by which the adjacent steerable wheel 34 is operatively connected with the front end of the chassis frame to trail the transverse beams 24 and 25.

The rear ends of the tractor arms 32 and 33 of each pair are operatively coupled with the spindle bolt of the adjacent steerable wheel by mechanism which is illustrated and described in detail in my copending application hereinbefore identified, and which mechanism is here identified as a whole by the reference numeral 37. This mechanism broadly includes the steering wheel spindle bolt 38, with couplings 39 and 40 between the upper and lower ends thereof and the rear ends respectively of the upper and lower arms 32 and 33 whereby the arms 32 and 33 may swing vertically at their rear ends about the transversely directed pivot bolts 35 and 36 to permit necessary up and down movements of the adjacent wheel.

The spindle bolt passes in its upper end portion through a sleeve or housing 41 which rigidly supports one end of an inwardly directed stub axle 42, the function of which will be hereinafter set forth. Below this housing 41 the spindle bolt is secured by bolts 43 to the inner side of the backing plate 44 of the adjacent wheel, in the usual or conventional manner, and in the area between the housing 41 and the lower coupling 40 the spindle bolt has secured thereto the steering arm 45.

The couplings 39 and 40 are of a universal type in that they not only permit the upper and lower tractor arms 32 and 33 to swing about horizontal axes but they also permit the necessary rotation of the spindle bolt with the wheel relative to the sleeve or housing 41 which carries the stub axle 42.

The inner end of each stub axle 42 has secured thereto an end of a stabilizer rod 46 which extends forwardly and is secured at its other end to the downwardly and rearwardly extending bottom portion 29 of the adjacent plate 27 as indicated at 47.

As is set forth in my prior application above referred to, the upper and lower transverse beams 24 and 25 support a transverse steering bar which is generally designated 48, by means of which bar the unitary movement of the front steerable wheels is effected. This bar is located in a plane between the beams 24 and 25 as shown in Fig. 3, and is pivotally coupled to the same, midway between its ends, for rocking movement on and about a vertically positioned pivot bolt 49 which is attached at its upper and lower ends to the beams 24 and 25 by brackets 50. These brackets, the details of the steering bar and the pivot bolt are also all illustrated and described in my prior application, as well as the wheel alignment tie rod connections 51 between the ends of the steering bar and the steering arms 45.

The numeral 52 in Fig. 1 generally designates the conventional drag link which is attached at its forward end to the tie rod 51 at the left hand side of the vehicle chassis and which functions to transmit steering power from the steering wheel or other steering control mechanism to the steering arms of the front wheels.

The outer ends of the transverse upper and lower beams 24 and 25 support the front end of a frame or super-structure over the steerable front wheels. Each of these frames or superstructures is generally designated 53.

The superstructures 53 in turn support the hereinafter described hydraulic units and cams by means of which the front end of the vehicle frame is raised and lowered.

Each of the frames or superstructures 53 embodies an inner forwardly and downwardly arching rail which is generally designated 54 and an outwardly spaced cooperating fender rail 55 which also arches forwardly and downwardly and these adjacent inner and outer rails 54 and 55 are substantially parallel and are disposed as a substantial elevation above the chassis frame and the underlying steerable wheels.

Each of the inner rails 54 has a forward end section 56 which is secured by a tubular adapter 57 to the outer end of the adjacent upper transverse beam 24 and rises therefrom and inclines rearwardly as illustrated in Fig. 3, to the rearwardly curving or rounded portion 58 and then extends rearwardly at a slight downward inclination to its rear end as indicated at 59. These rails 54 are preferably of tubular material.

Secured to each side beam 12 of the chassis frame and rising from the rear end of the portion 12c thereof is a superstructure supporting post 60 to which the rails 54 and 55 are attached in the manner about to be described.

The upper ends of the posts 60 have secured thereto a transversely extending body support beam, which is preferably of tubular material, and which is approximately the same length as the transverse forwardly positioned beams 24 and 25.

The numeral 62 designates an angle bracket which is disposed adjacent to and upon the inner side of the upper end of each post 60 and which bracket has an upwardly and forwardly extending arm 63 to which the rear end portion 59 of the adjacent rail 54 is rigidly secured. A second arm of each bracket is designated 64 and is directed downwardly and in the angle between the arms the bracket is formed to have the transverse body support beam 62 pass therethrough and such beam is secured to the bracket by welding or in any other suitable manner.

Upon each outer end of the body supporting beam 61 there is fixed a second angle bracket which is designated 65 and is of substantially the same form as the adjacent bracket 62. Each outer end of the beam 61 passes through the bracket 65 at the angle between the two arm portions thereof and one of the arm portions of each of these brackets which is designated 66, is directed upwardly and forwardly and has rigidly secured thereto the rear end of the adjacent outer fender rail 55.

The other angle portion of arm portion of the bracket 65 is designated 67 and is directed downwardly as shown in Fig. 8 and these downwardly directed arms 67 support mechanism hereinafter to be described.

Each of the outer fender rails 55 has, like the adjacent rail 54, an upwardly and forwardly arching rear section 68 which joins a downwardly, forwardly and inwardly directed forward end portion 69 which is secured at 70 to the adjacent end of the upper one of the transverse cross beams, namely, the cross beam 24.

The downwardly extending forward end portions 56 of the inner rails 54 are coupled together by a front transverse stabilizer 71 which is secured at its two ends to the sections 56 by the bracket ears 72 which are welded or otherwise attached to these rail sections, as shown in Fig. 5. To further rigidify the front end structure the transverse stabilizer bar 71 has secured thereto adjacent to the longitudinal center line of the chassis structure, the downwardly diverging struts 73 and the lower ends of these struts are rigidly secured to the adjacent side beams 12 of the chassis frame in the forward end portions 12a thereof.

Disposed beneath the body support beam 61 at each end thereof is a short body support beam in the form of a tubular member 74 and these short beams 74 connect and are secured at their ends to the adjacent depending arm portions 64 and 67 of the angle adapter brackets 62 and 65. These short beams 74 accordingly each spans the space between the rear end portions of adjacent rails 54 and 55 and function to support a jack shaft in the manner about to be described.

The numeral 75 generally designates the jack shaft assembly on each side of the chassis structure by means of which assembly the hereinafter described operative coupling is established between a front hydraulic body elevating unit, generally designated 76, and a cam structure, generally designated 77 and mounted upon the underside of the rear portion 59 of a rail 54.

Each jack shaft assembly 75 comprises a rigid fixed shaft 78 which is disposed forwardly of and parallel with a short beam 74 and the outer ends of the shaft 78 are mounted in rubber sleeves 79 which in turn are mounted in a cylindrical jacket 80.

As shown in Fig. 19, the outer end of the shaft 78 together with the sleeve and jacket thereon is located inside of the adjacent fender rail 55 while the inner end of the shaft 78 together with the rubber sleeve 79 and jacket 80 is on the inner side of the inner rail 54. As shown in Fig. 6, the outer end of the shaft 78 thus is positioned within the area defined by the spaced inner and outer rails 54 and 68.

The jack shaft assembly is coupled to and maintained in forwardly spaced relation with the short beam 74 by a spacer body or block 81 in cooperation with a U-bolt 82, the yoke portion of which encircles the jacket 80 while the legs thereof extend rearwardly above and below the spacer body 81 and across the short beam 74 and are secured in an anchor plate 83 which is disposed vertically across the rear side of the short beam 74 as illustrated in Fig. 7.

In order to maintain the jacket 80, the sleeve and shaft 79 and 78 carried thereby against turning, each jacket carries a pin 84 which extends into the adjacent spacer body 81 as shown in Fig. 7.

Surrounding and rotatably supported on the fixed shaft 78 and positioned between the jackets 80 is a rotatable tubular shaft 85. In each end of this tubular shaft 85 is fixed a bearing collar 86 which encircles and is adapted to turn on the stationary or fixed shaft 78.

Fixed to the outer end of each tubular shaft 85 is a short upstanding thrust arm 87 which cooperates with the rear end portion of the adjacent hydraulic body elevating unit 76 in the manner hereinafter described.

At the inner end of the tubular shaft 85 there is fixed to the tubular shaft one end of a depending thrust arm 88 to the lower end of which is pivotally coupled by means of a yoke 89 an end of an upwardly and forwardly extending thrust link 90. The other or forward end of the thrust link 90 carries a spring thrust jaw 91. Between the yoke 89 and the jaw 91 the thrust link includes a tube 92 the ends of which are adjustably connected with the yoke and thrust jaw by threaded stems 93 carried by the yoke and thrust jaw to facilitate the adjustment of the length of the thrust link.

Each thrust jaw 91 embodies the two spaced jaw parts or members 94 between which extends a pivot pin 95 on which is rotatably mounted on suitable roller bearings 96, a cam follower roller 97.

As shown in Fig. 20, the stub axle 42 which is carried by the housing 41 for each spindle bolt, has the rear end of the adjacent stabilizer rod 46 coupled thereto and upon the outer side of the stabilizer rod the stub axle 42 is supported in a collar 98 which is integral with the inner ends of two vertically spaced supporting arms 99 the upper one of which arms is rigidly coupled directly with the housing 51 while the lower one is integral with a roller bearing housing 100 which in turn is integral with the housing 41 and in which the spindle bolt turns as illustrated and described in my prior application hereinbefore referred to.

Between the collar 98 and the housing 41 the stub axle 42 carries a vibration absorbing sleeve 101 of rubber or rubber composition of suitable character and this sleeve is encircled by a collar 102 which forms the lower end portion of the body support arm 103.

The upper end of each body support arm is forked providing the two jaw parts 104 and these jaw parts have the pivot pin 95 extended through bearings 105 which the jaw parts carry. Also, as shown in Fig. 21, the jaw parts 104 and bearings 105 carried by the body support arm are located between the ends of the cam follower roller 97 and the jaw parts 94 of the spring thrust jaw 91.

As shown in Fig. 3, where one of the two body support arms is illustrated, such support arms extend rearwardly from the stub axles 42 upon which they are mounted and curve upwardly and forwardly to join the upwardly and forwardly extending end of the adjacent thrust link and to maintain the cam follower roller in position for engagement with the overlying cam member 77, about to be described, and through which the support of the body carrying superstructure is maintained upon the underlying running gear.

Returning now to Fig. 19, it will be seen that the inner rail 54 of each of the superstructures 53 carries or has secured thereto upon its underside in the rear portion 59 thereof and rerawardly of the upper end of the adjacent body support arm 103, two depending mounting ears 106 which are spaced apart in the transverse direction of the overlying rail. Between these ears 106 is mounted a pivot bolt 107 which passes through the bearing sleeve 108 carried by and across an end of a cam body 109 and which cam body comprises a substantially arcuate flat cam track 110 having extending medially of the back or upper side thereof a relatively wide rib 111.

Each of the cam tracks 110 is formed with a relatively long and comparatively straight mid portion 112 which terminates at the upper end in the relatively widely curved portion 113 while at the lower end the cam track terminates in a sharply curved or reversely bent stop portion 114 which functions as will be hereinafter made clear, as a means for limiting the movement downwardly on the cam track of the thrust roller 97.

Adjacent to the lower free end of each of the cam tracks there is fixed to one side of the rib 111 a grounding switch structure which is generally designated 115, which is incorporated in the hereinafter described electrical system.

Each of the cams 77 has a point or location designated on the track 110 at approximately midway between the ends of the portion 112, to indicate the neutral location of the thrust roller 97 and this central position is designated 116. This central position or location indicates the point where the thrust or cam follower roller will normally engage the cam track for the non-elevated position of the vehicle body or, in other words, at the point where the suspension springs are set for a low rate, as will be hereinafter more clearly set forth.

The rib 111 of each of the cam tracks is provided upon the top edge and approximately midway between the ends of the cam with a seat plate 117 which is engaged by an adjustable stop pin 118 which is threadably attached to an overlying bracket 119' which in turn is secured to the overlying rail 54. By means of this stop pin 118 the desired angular position of the cam can be obtained and it will be seen that by threading the stop pin upwardly the cam can swing forwardly and upwardly upon the pivot 107 where the cam track will be at a flatter position or by rotating the pin in the opposite direction the cam track can be set more nearly toward a vertical position.

Disposed across between the inner and outer rails 54 and 55, respectively, is a support bridge 119 to which is attached the forward end of the horizontally disposed hydraulic body elevating and spring suspension unit which is generally designated 76.

One of these units 76 is illustrated in longitudinal section in Fig. 8 and in this figure the middle portion of the unit has been broken away to facilitate showing the smaller parts on an enlarged scale. The unit 76 comprises a guide cylinder 120 having a rear end closed by a head or cap 121 and fixed to this cap are two rearwardly directed spaced mounting ears each of which is designated 122. The upper end of the adjacent short vertical thrust arm 87 is disposed between the ears 122 and carries a bearing sleeve 89a through which extends the pivot bolt 123 and this bolt also passes through the ears as shown in Fig. 19.

The forward end of the guide cylinder 120 has extended thereinto the closed end of a fluid cylinder 124 which closed end of this cylinder is designated 125. The opposite end of the fluid cylinder 124 is defined by an outturned abutment flange 125a, the purpose of which will be hereinafter set forth.

The forward end of the fluid cylinder has slidably extended thereinto a hollow piston 126. This piston 126 is closed at its forward end by the cap or head 127 and this cap or head carries a forwardly extending stud 128 which is disposed between a pair of depending mounting ears 129 secured to the underside of the adjacent bridge 119. Extending through the stud 128 and the ears 129 is a pivot pin 130.

By the means thus far described it will be seen that each of the forward hydraulic body elevating and spring suspension units 76 is supported substantially horizontally between the adjacent inner and outer rail members 54 and 55 and that oscillatory movement of the upright thrust arm 87 attached to the rear end of the guide cylinder 120 will effect relative reciprocal movement between this guide cylinder and the fluid cylinder 124 and also the movement of the fluid cylinder 124 upon the piston 126 which is held against independent axial movement by its attachment to the bridge 119.

The piston 126 has the inner end closed by a relatively thick or heavy head 131 through which are formed two openings 132 and 133 and the inner end of the piston adjacent to the head is provided with conventional packing or piston rings 134 which bear against the inner surface of the cylinder 126 to prevent leakage between the walls of the piston and cylinder of fluid in the cylinder between the heads 125 and 131.

As will be hereinafter set forth, these pistons of the forward hydraulic body elevating and spring suspension units 76 and similarly constructed units at the rear end of the chassis structure, are connected in a hydraulic system to receive fluid under pressure for effecting the separatory movement of the pistons and cylinders when it is desired to elevate the vehicle body above its normal position. For the introduction of fluid into the cylinders 124 between the head ends thereof and the piston, each hollow piston has fixed in the wall thereof a fluid line coupling 134a with which is connected upon the inner side of the piston body the tube or pipe 135 which extends rearwardly and passes through and is sealed in the piston head opening 132 for the discharge of fluid into the space between this head and the cylinder head 125.

The wall of the piston 126 also has fixed therein an air bleed nipple 136 which is of a type to be opened and closed by a suitable tool and connected with this nipple upon the inside of the piston is an air bleed tube 137 which passes rearwardly and through and is sealed in the opening 133 in the piston head 131. The rear end 137a of the tube 137 is turned to extend to a position relatively close to the wall of the cylinder 124 in which it is located and the parts are oriented upon installation so that this turned end 137a will be directed upwardly in the cylinder 124, as illustrated in Fig. 8. In other words, the turned end 137a of the air bleed tube will lie close to the upper or highest side of the fluid cylinder 124 so that when the system is being filled, the air bleed nipple can be opened to bleed off air from the cylinders and thus insure the complete filling of the cylinders with fluid only.

The guide cylinder 120 between the rearmost end of the fluid cylinder 124 and the cap 121 has attached thereto and opening thereinto a lubricant supply nipple or coupling 138. Also this rear portion of the cylinder 120 is supplied at an elevation above the nipple 138 with an overflow aperture 139 which controls the level of lubricant in the cylinder.

Encircling the apertured portion of the cylinder 120 is a felt sleeve or cover 139a which may be held on in any suitable manner as by the use of resilient snap rings or the like. This sleeve or cover permits the necessary breathing action for the drawing in of air to the cylinder 120 and the escape of air therefrom in back and forth movement of the piston cylinder 124 and also prevents the entrance of dust or dirt into the guide cylinder.

The rear end portion of the guide cylinder 120 has secured therearound adjacent to and forwardly of the breathing opening 139, a collar 140. Fixed to this collar and encircling the cylinder 120 is a thrust plate 141.

Positioned forwardly of the thrust plate 141, which constitutes a holding means for the rear end of the about to be described coil suspension spring, is a forward or front thrust plate 142 which surrounds the movable piston cylinder 124 and is secured to the flange 125a thereof.

Interposed between the rear and forward thrust plates 141 and 142 is a coil suspension spring which is generally designated 143 and which is placed under compression when fluid is injected under pressure through the inlet tube 135 into the fluid cylinder 124 to force the cylinder rearwardly on the piston to thereby effect desired elevation of the chassis and body structure supported thereby through the oscillation of the jack shaft to impose thrust against the adjacent cam unit 77. This action at the front of the chasis frame on both sides will, of course, elevate the front of the chassis and the vehicle body and a corresponding action, hereafter described, takes place at the rear of the chassis frame to elevate the rear portion of the latter and the vehicle body supported thereon.

In order to shield or protect the spring 143 and the relatively movable cylinders 120 and 124, the rear thrust plate 141 has fixed thereto a semi-cylindrical light metal shield 144 which shield overlies the spring and is open on the lower side thereof.

*Rear end construction*

Figure 2:
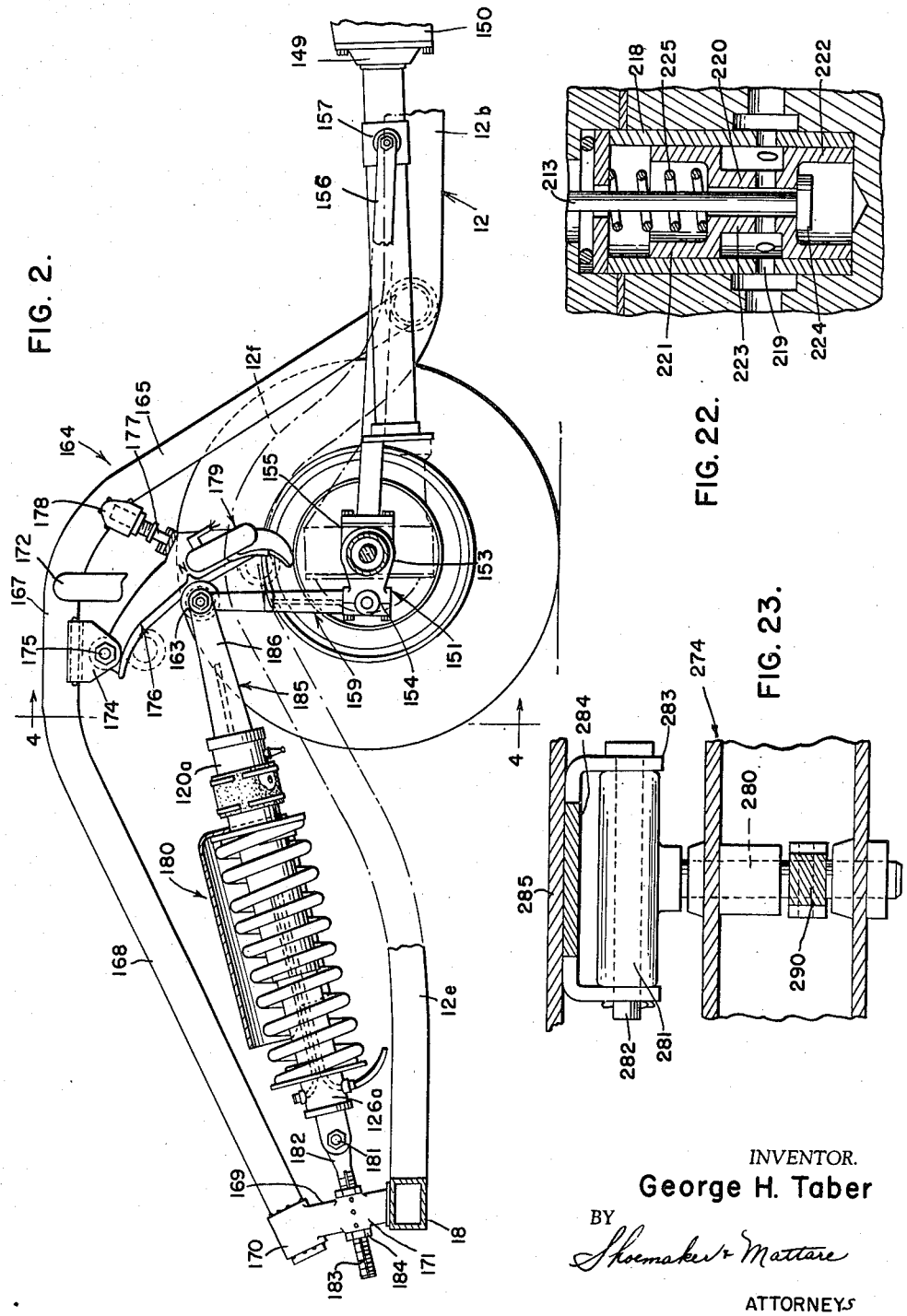
Fig. 2 is a longitudinal sectional view in which the section is taken in a vertical plane through the rear portion of the structure shown in Fig. 1, approximately on the line 2—2 of Fig. 1 and with parts not falling in the section line, sectioned and/or broken away, the view being on an enlarged scale.
Figure 4:
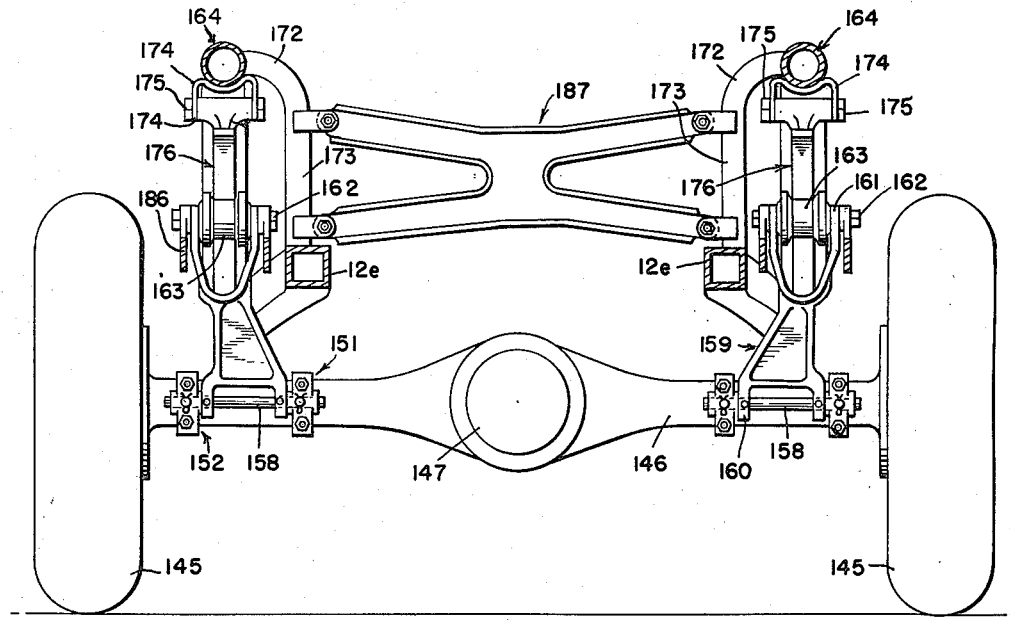
Fig. 4 is a vertical transverse section taken approximately on the line 4—4 of Fig. 2.

Referring now particularly to Figs. 1, 2 and 4, it will be seen that the inset rear end portions 12e of the chassis frame are curved upwardly to pass over the rear axle housing of the rear wheel suspension mechanism, this upwardly curved portion being well illustrated in Fig. 2 where it is designated 12f. It will also be apparent from this view as well as from Fig. 1, that the inset portions 12e of the side beams and chassis frame extend a substantial distance rearwardly of the rear wheel axle housing, such rear end portions, where they lie rearwardly of the upwardly curved portion 12f, being straightened out to substantially lie in the plane of the intermediate portion 12b.

The rear wheels are generally designated 145 while the conventional rear axle housing is designated 146 and, as previously stated, is bridged by the upwardly curved portions 12f of the chassis frame and the numeral 147 designates the differential housing with which is connected the torque tube 148. The forward end of this tube is connected by the usual or conventional universal coupling 149 with the transmission housing 150 and this housing is here illustrated as connected to and supported by the intermediate transverse brace beam 16.

The rear axle housing, in each of the two portions 146 thereof, has secured thereto at the outer end thereof, the inner and outer rear body support arm mounting brackets 151 and 152. Fig. 2 shows an inner one of these brackets, designated 151, and which as shown comprises a collar portion 153 which is secured around the axle housing and carries a rearwardly extending capped bearing 154. Each of the outer brackets 152 is also of the same construction as the inner bracket 151 adjacent thereto with the addition of a forwardly extending part 155 to which is fixed the rear end of a diagonal brace rod 156. These diagonal brace rods converge at the forward end of the torque tube 148 to which they are attached by a suitable collar or attaching means 157.

Each pair of brackets 151 and 152 supports in and between the bearing portions 154 thereof, a pivot bar 158.

Upon each of the pivot bars 158 is mounted a rear body support arm which is generally designated 159 and which corresponds in its function to the forward body support arms 103. Each of the arms 159 is formed with two spaced ears 160 upon its lower end which lie between a pair of bracket bearings 154 and have the pivot bar 158 extending therethrough.

Each rear body suporting arm 159 at its upper end is bifurcated, the two parts or furcations being designated 161 and these have extending transversely therethrough and are connected by a pivot bolt 162 which supports between the furcations a cam follower roller 163.

At each side of the chassis frame and extending throughout the length of the inset rear end portions 12e of the side beams is an auxiliary body supporting arched or superstructure frame which is generally designated 164. This frame, at each side of the chassis, embodies a front end section 165 which is fixed at its lower end to the outer side of the adjacent chassis frame side beam as indicated at 166 in Fig. 1, and this portion extends upwardly and rearwardly, arching over the underlying axle housing 146 as indicated at 167 in Fig. 2 and then continues in the long, straight, downwardly and rearwardly extending rear portion 168.

The rear cross beam 18 of the chassis frame extends at each end slightly beyond the chassis frame side beam and has fixed thereon an upstanding anchor post 169, the top of which post is formed as a sleeve or collar 170 in which the end of the arched frame portion 168 positions and is fixed. Between the beam 18 and the top or collar 170 the post 169 is formed to provide a rearwardly directed guide 171 in which is fixed a suitable key, not shown, for the purpose hereinafter set forth.

The highest portion or arch portion 167 of each frame 164 is fixed to the outwardly curving top end portion 172 of a supporting post 173 and this post is mounted on and rigidly secured to the underlying portion of the adjacent chassis side beam.

Fixed to the underside of the arch portion 167 of each frame 164 are the two depending bracket ears 174 which correspond to the previously described ears 106 carried by the inner front end side rails 54 and supported upon the pivot 175 which extends across between and connects these ears 174 is the upper end of a downwardly and forwardly inclined thrust cam unit 176. This cam unit is of the same form and size as the front cams 77 and accordingly a detail description of the same will not be required. Like the front cam units each of the rear cam units 176 is held in adjusted position against forward and upward swinging by the threaded stop and adjustment pin 177 which is threadably attached to the underside of the adjacent frame or rail 164, as indicated at 178 in Fig. 2.

These rear cam units 176 also carry grounding switch units which are here designated 179 and are of the same construction as the front grounding units 115, the detailed construction of which will be hereinafter set forth.

As will be seen in Fig. 2, the cam unit 176 lies directly above the upper end of a body support arm 159 so that the cam surface or track can be engaged by the arm carried follower roller 163.

The numeral 180 generally designates the rear hydraulic body elevating and spring suspension unit located on each side of the chassis frame for interposition between the upper end of the adjacent body support arm 159 and the adjacent anchor post 169.

These rear hydraulic elevating and spring suspension units are essentially of the same construction as the front units hereinbefore described and one of which is illustrated in detail in Fig. 8, with the exception of the connecting means between the stationary piston of the unit which is here generally designated 126a, and the anchor post 169, and with the exception of the specific form of the connection between the end of the guide cylinder and the body support arm, which guide cylinder is generally designated 120a. These rear units 180 are also reversed with respect to the forward units in that the attached end of the piston 126a is directed rearwardly and the outer end of the guide cylinder 120a is directed forwardly.

The piston 126a is connected by means of a pivot bolt 181 with the head end of a long screw or threaded stem 182. This screw passes through the guide 171 and is provided with a keyway 183 in which is engaged the key carried on the inside of the guide 171 so that rotation of the screw in the guide is prevented. At each end of the guide the screw 182 has threaded thereon the nuts 184 by means of which axial movement of the screw through the guide is effected when desired and also the screw is fixed against movement after the desired adjustment has been made.

The forwardly directed end of the guide cylinder 120a carries a forked or bifurcated arm 185 and the two parts or furcations of such arm are designated 186 and as shown in Fig. 4 they receive between them the bifurcated end of the adjacent body support arm 159 and have extended through them the pivot pin or bolt 162 on which the cam follower roller 163 is mounted.

To further rigidify and stabilize the rear end structure the posts 173 are connected by the transverse stabilizing plate or strut 187 which is located adjacent to the rear part of the rear seat of the vehicle body structure, not shown, which is supported upon the forward superstructures and the auxiliary superstructure or arched frames 164 at the rear of the chassis.

As will be seen upon comparing the structures forming Figs. 2 and 3, the hydraulic elevating and spring suspension units 76 at the front end of the chassis frame are at a substantial elevation above the units 180 at the rear of the chassis. This relationship between the front and rear units is effective in substantially cancelling any contrary inertia effects which may be imposed upon the steering mechanism or steering control of the mechanism particularly in negotiating a curve or turn in the roadway.

*Fluid system*

As hereinbefore set forth, the elevation of the vehicle body with respect to the running gear and the changing of the rate of the suspension springs simultaneously therewith is effected by means of a hydraulic unit adjacent to each of the four wheels.

Figure 11:
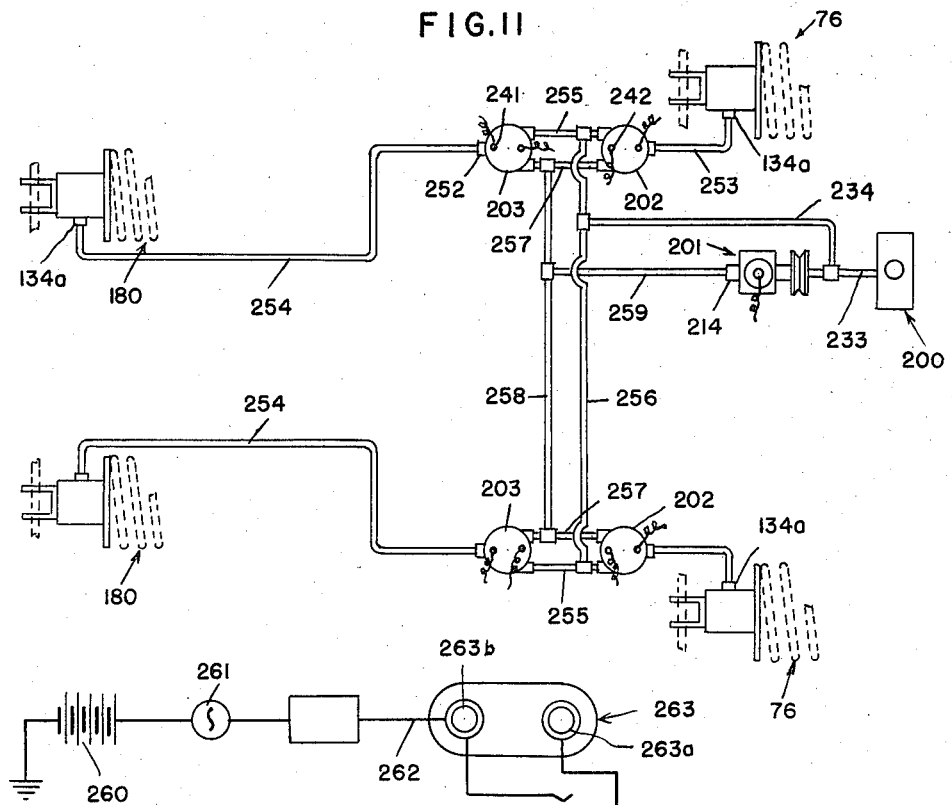
Fig. 11 is a schematic diagram of the fluid system including diagrammatic showing of the fluid pump, the electromagnetically controlled valve associated with the pump or forming a part of the pump, the pairs of electromagnetically controlled valves at the sides of the vehicle and associated with the adjacent hydraulic units, portions only of the latter being diagrammatically represented.

Fig. 11 shows the lay-out of the hydraulic system where the front hydraulic and spring suspension units 76 are partially and diagrammatically illustrated, together with the rear hydraulic and spring suspension units 180.

As has also been previously set forth, each of the hydraulic units is of the same construction in the form and association of the cylinders and pistons and the tubular guides, as for example, the guide 120 shown in Fig. 8, in which the piston cylinder moves when the fluid is injected under pressure into the cylinder between the end thereof and the head of the piston therein.

In Fig. 8, which represents a front hydraulic unit, the fluid inlet nipple is designated 134a. Each of the rear hydraulic units is of a similar construction to the front units and the rear units also have the fluid inlet nipples thereof designated 134a.

As will be seen in the following description, these nipples 134a, while referred to as inlet nipples, also function to pass fluid out of the units so that they become two-way connections.

Figure 12:
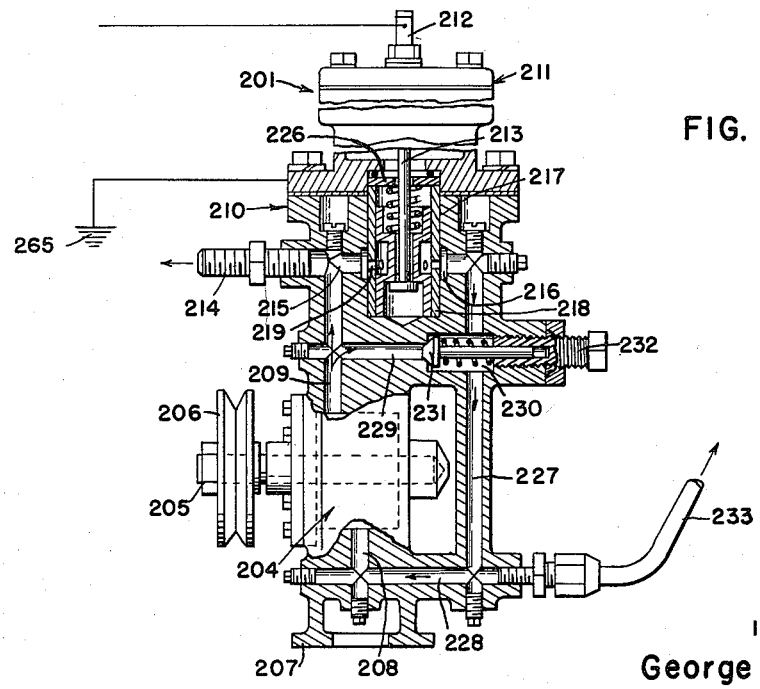
Fig. 12 is a view on an enlarged scale partly in side elevation and partly in vertical section of the combined fluid pump and electromagnetically controlled valve associated therewith and by which, when energized, the by-pass conduit is closed to effect the pumping of fluid into the hydraulic elevating units.

For supplying hydraulic fluid to the system, there is provided the reservoir 200 which may be positioned at any suitable location on the vehicle body and for drawing fluid from the reservoir and introducing it into the system, there is provided the pump and by-pass unit which is generally designated 201 and which is shown in detail partly in elevation and partly in vertical section in Fig. 12.

At each side of the vehicle structure or for association with the pair of front and rear elevating units 76 and 180 on each side of the system, there are the two solenoid actuated supply and release valves 202 and 203, the valves 202 being here illustrated as being connected with the adjacent front hydraulic units and the valves 203 being illustrated as being connected with the rear hydraulic units.

The fluid pump structure shown in Fig. 12 is designed to be mounted in convenient location on the vehicle chassis to be coupled with the fan belt pulley or any suitable part of the vehicle engine by means of which the pump may be operated. This pump is preferably of gear type and the fluid driving gears, not shown, are enclosed in the housing 204 and are connected with the operating shaft 205 on which is mounted the pulley 206 by which belt drive connection is effected with the fan belt pulley shaft.

The pump unit has the gear housing 204 supported upon a suitable base 207 by which the entire structure is mounted. In the lower part of the pump housing 204 is the fluid intake passage 208 while the numeral 209 designates the outlet passage from the pump.

Above the pump housing is a body structure 210 in which are formed various fluid passages about to be described, together with a solenoid actuated control valve structure, the actuating solenoid for which is shown in side elevation and generally designated 211 and the numeral 212 designates the terminal for establishing electrical connection with the solenoid coil, not shown.

The solenoid 211 when energized, performs the desired function by actuation of an armature, not illustrated, with which is connected the valve stem 213 which extends downwardly into the body 210 in the manner illustrated for connection with the hereinafter described valve sleeves which when shifted by the solenoid through the attached stem effect the opening and closing of this valve and which valves provide a by-pass under certain conditions for the fluid moved by the gear pump.

The pump outlet passage 209 leads to the outlet nipple 214.

This passage also communicates through the inwardly directed bore 215 with an annular chamber 216 formed in the valve body 210 around the wall of the valve sleeve bore 217 in which is fixed the valve sleeve 218. This sleeve has formed therethrough an annular series of ports 219 which communicate with the chamber 216.

The valve stem 213 extends downwardly into and axially of the sleeve 218 as illustrated, and extends into and through the elongate valve body 220 which has the upper and lower cylindrical skirts 221 and 222 connected by the constricted intermediate portion 223 in which the lower end of the stem 213 is snugly fitted and the lower end of the stem carries a head 224 which is located in the lower skirt portion while the upper skirt portion 221 receives the lower end of an expansion spring 225 which encircles the stem and bears against the upper end of the intermediate or constricted portion 223.

The upper end of this spring bears against a centrally apertured plate 226 which is secured to the top of the ported valve sleeve 218. This spring 225 constantly urges the valve body 220 downwardly and maintains the skirt portion 222 at the lower end of the body below the ports 219. These skirts, of course, fit snugly in the sleeve 218 and, therefore, it will be seen that when the valve body is drawn upwardly by the stem 213 under the influence of the energized solenoid, the lower skirt portion 222 of the valve will be moved into closing position over the ports 219 and this movement will be opposed by and will cause the compression of the spring 225. Thus when the solenoid is de-energized the spring will return the valve body to valve open position.

Also connected with the annular chamber 216 is the fluid return passage 227 which connects with a two-way nipple 228 at the bottom part of the pump housing and this nipple as shown also connects with the pump inlet 208.

Between the by-pass valve in the body 210 and the pump housing there is formed the pressure relief passage 229 which is connected with a valve chamber 230. The fluid by-pass passage 227 is also in communication with this chamber 230.

The chamber 230 houses a spring pressed valve 231 which normally closes the end of the passage leading into the chamber and an adjustment nut 232 in the outer end of the chamber provides means for regulating the tension of the spring on the relief valve 231.

From the description thus far given of the pump and fluid by-pass unit, it will be seen that when the pump is operating, fluid will be drawn in through the inlet nipple 228 and delivered from the pump housing by way of the passage 209. If the solenoid 211 is not energized, the valve body 220 will be in its lowered position and fluid may then be by-passed through the valve to the return passage 227. This will result merely in circulation of the fluid by the pump in the passages 208, 228, 209, 215 and 227, and no fluid will be delivered to the hydraulic units through the nipple 214.

The fluid supply nipple 228 is connected by the pipe 233 with the reservoir 200. This pipe also has connected therewith a fluid return line 234 which is connected with the solenoid actuating supply and release valves in the manner hereinafter described.

*Solenoid actuated supply and release valves*

In the fluid hydraulic system there are four of the solenoid actuated supply and release valves, there being two on each side of the system as hereinbefore stated, and Fig. 13 illustrates partly in vertical section and partly in side elevation a pair of these valves, with their intermediate connections. Since the valves 202 and 203 are of the same construction, the description will be confined to one of the same.

Each valve comprises a vertically disposed body 235 having the cylindrical chamber 236 the lower end of which is closed in a suitable manner as by the head 237.

The numeral 238 designates a bracket arm integral with the body 235 for mounting the valve structure.

Upon the top of the body 235 is a solenoid valve unit which is generally designated 239 and which has an armature body, not shown, with which is connected a stem 240 which extends downwardly through the major portion of the length of and axially of the cylinder 236. The numerals 241 and 242 designate electrical terminals connected with the ends of the solenoid coil, not shown. Within the cylinder 236 is mounted the spool member 243 which comprises an intermediate sleeve portion 244 having connected with its ends the upper and lower port opening and closing skirts 245 and 246, respectively, which fit snugly in the cylinder 236.

The stem 240 extends through the intermediate sleeve 244 of the valve spool into the lower skirt 246 where it is attached by the head 247. Within the upper skirt 245 is supported the lower end of the expansion coil spring 248 which encircles the stem 240 and bears at its upper end against the head plate 249 which is fixed at the top of the body 235. This spring 248 normally urges the valve spool 243 downwardly.

The body 235 carries an upper coupling nipple 250 and a lower nipple 251 which open into the cylinder 236. These nipples are, of course, spaced apart longitudinally of the cylinder and they form respectively exhaust nipples or exhaust ports and supply ports for the cylinder.

Also carried by the body 235 is a pipe nipple or coupling 252 which is located in a plane intermediate the nipples 250 and 251 and this nipple 252 also communicates with the cylinder, as illustrated. The nipple 252 provides a two-way port for passing fluid into and out of the cylinder and it is located so as to be at all times open, or in other words, it always is in communication with the space between the upper and lower skirts 245 and 246 of the valve spool.

The ports 250 and 251, however, are located so that in either of the two positions to which the valve spool may be moved, one of them will be covered or closed by the adjacent skirt. For example, when the valve spool controlling solenoid is de-energized so that the spring 248 forces the spool downwardly, the lower skirt 246 will uncover the fluid inlet or supply port 251 and this will be in communication with the port provided by the nipple 252 to permit fluid to pass through the valve to the cylinder of a hydraulic unit. When the solenoid 239 is energized the valve spool 243 will be drawn upwardly and the lower skirt 246 will close the supply port provided by the nipple 251 and the upper skirt 245 will shift to open the exhaust port which the nipple 250 provides or forms. Thus the exhaust port will be put in communication with the port provided by the nipple 252 to permit fluid to return from the cylinder of a hydraulic unit and pass back to the reservoir through the pipe system about to be described.

The coupling nipple 134 of each front hydraulic unit is connected by a fluid pipe 253 with the nipple 252 of the adjacent unit 202.

The coupling nipple 134 of each of the rear hydraulic units is connected by a pipe 254 with the nipple 252 of the adjacent unit 203. These pipes 253 and 254 function to carry fluid both to the hydraulic units and away therefrom in the operation of the system.

Each two adjacent units 202 and 203 have the exhaust ports provided by the nipples 250 coupled together by the pipe 255 and this pipe coupling one pair of units 202 and 203 is connected by a cross-over pipe 256 with the corresponding pipe 255 of the two units 202 and 203 on the opposite side of the system. This cross-over pipe 256 has an end of the return flow pipe 234 connected therewith for the carrying of fluid back to the pipe 233 which couples the reservoir 200 with the pump nipple 228.

Each pair of adjacent units 202 and 203 also have the supply ports provided by the nipples 251 connected together by the pipe 257 and these pipes 257 are connected by a cross-over pipe 258 which in turn is connected by the pipe 259 with the pump outlet nipple 214.

*Electrical system*

Fig. 24 illustrates the lay-out of the electrical or wiring system for the actuation and control of the solenoids associated with the pump structure and with the supply and release valves. Electric current for the system is or may be supplied from the conventional motor vehicle battery which is designated 260. In the circuit the numeral 261 designates the conventional ignition circuit control switch and this switch also controls the flow of current to the system and is connected by a wire 262 with one side of a push button on-off switch which is generally designated 263 and which may be mounted in the vehicle body in a suitable convenient location for the operator.

The switch 263 is connected by the conductor 264 with the terminal 212 of the solenoid which controls the by-pass valve associated with the pump. This solenoid is grounded on one side as indicated at 265.

Each pair of solenoid actuated supply and release valves 202 and 203 are series connected with the grounding cam switches 115 and 179 of the adjacent front and rear wheel cams, by the conductors 266, 267 and 268. The conductors 268 electrically connect together the terminals 242 of the adjacent pair of units 202 and 203 while the conductor 266 connects a terminal 241 with the adjacent front wheel grounding switch 115 and the conductor 267 connects the terminal 241 of the rear unit 203 with the adjacent rear grounding switch 179.

The two pairs of units 202 and 203 are also electrically connected in parallel with the current supply conductor 264 by the conductors 269. As shown in Fig. 24, each of these two conductors 269 is connected at one end with the conductor or line 264 which runs between the switch 263 and the terminal 212 of the pump and the other end of each conductor 269 is connected with a conductor 268 which is in circuit with a pair of units 202 and 203. Accordingly it will be seen that the closing or grounding of either of the front cam switches 115 will energize the solenoid of the associated front unit 202 and the closing or grounding of either of the rear cam switches 179 will effect the energization of the solenoid associated with the corresponding rear unit 203. The effect of the closing of these grounding switches or cam switches will be set forth in the description of the operation hereinafter given.

Associated with the electrical system for the control by the vehicle operator of the solenoids of the units 202 and 203 on either side of the system is a foot accelerator switch structure which is generally designated 270.

The details of the foot accelerator switch 270 are shown in Figs. 14 to 18, inclusive. In these figures the numeral 271 designates a portion of the toe-board forming a part of the floor of a vehicle body in front of the vehicle operator's seat. This toe-board is provided with an opening 272 in which is hung the accelerator switch and the mounting for the foot accelerator.

The accelerator switch structure comprises a top or cover plate 273 which is of sufficient size to completely close the opening 272 when it is placed on the surface of the toe-board 271 over the opening and fixed to the underside of the cover plate 273 is the switch mechanism box 274 which has the flange 275 about the top of the side and end walls and which is bolted or secured in a suitable manner as indicated at 276 to the underside of the cover 273. This box is of a size to extend through the opening 272 as illustrated, and when so disposed the portion of the cover 273 lying outside of the top of the box is secured to the toe-board by screws, bolts or the like as indicated at 277.

The bottom wall of the box 274 is formed at one end of the box or that end which would be under the heel of the operator's foot on the accelerator pedal, with a short bearing 278 and in axial alignment with this bearing, when the cover 273 is in position, is a bearing sleeve 279 which is carried by or formed integral with the cover 273.

Extending through the sleeve 279 and engaged at its lower end in the bearing 278 is the accelerator pedal post 280 which carries on its upper end a cross head sleeve 281. This sleeve has extending through it the pivot pin 282 which also passes through the pair of pivot ears 283 which form a part of a plate 284 and this plate is fixed in a suitable manner to the underside of the accelerator pedal 285.

This pivoted end of the accelerator pedal is, of course, the lower end and adjacent to the upper end of the pedal has extending outwardly from both sides the arms 286 each of which has an upturned terminal stop 287 for engagement by the side of the foot resting on the accelerator pedal.

At the upper end of the pedal 285 the underside thereof carries the usual conventional means for attaching to the pedal the accelerator rod 288 as illustrated in Fig. 15.

The connection between the rod 288 and the accelerator pedal 285, which connection is designated 289, will be of suitable type or have a suitable degree of looseness to permit a slight swinging or oscillation of the accelerator pedal about the axis of the pivot post 280, whereby rotation of the post 280 to the desired extent is permitted for effecting the closing of the switch contacts about to be described.

Within the switch box 274 there is positioned the elongate switch arm 290. This arm at one end carries a collar 291 which encircles the post 280 and is locked thereto by the cross pin 292 so that when the post 280 is turned, the arm 290 will swing transversely in the switch box. Intermediate its ends the arm 290 is enlarged slightly as indicated at 293 and this enlarged portion is located between two spring pressed fingers 294 which are mounted on and depend from a pin or bolt 295 which extends transversely in the switch box and passes through and is supported by a hanger 296 which is fixed to the cover plate 273 as illustrated in Fig. 17. The means here shown for fixing the hanger 296 is a threaded stud 297 which passes through the cover plate to receive a nut on the upper side thereof but any other suitable attaching means may be employed.

As shown in Fig. 17, the pin 295 has removably attached to its two ends the discs 298 and between each of these discs and the adjacent finger 294 is a spring 299. These springs function to constantly force the fingers inwardly toward the sides of the hanger 296 but it will be seen that the fingers are loosely mounted on the pin 295 so that when the switch arm 292 is swung or oscillated with the turning of the post 280, one or the other of the springs will be put under compression and when the foot is released from the accelerator pedal the compressed spring will return the switch arm to its straight forward switch-open position.

The switch arm 290 carries at its forward or free end two pairs of contact points. These pairs of contacts are spaced apart longitudinally of the arm as shown in Fig. 18, and the two forwardmost contacts are designated 300 while the two rearmost contacts are designated 301. The contacts 300 are on opposite sides of the arm as are also the contacts 301.

The forward pair of contacts 300 are located between two spaced terminal contacts 302 which are insulated from the switch box cover plate 273 and depend therefrom. Each of these forward terminal contacts 302 is electrically connected by a conductor 303 with the terminal 241 of a unit 202. In other words, one terminal 302 is connected with the terminal 241 of the unit 202 on the right side of the vehicle and the other terminal contact 302 is electrically connected by a conductor 303 with the terminal 241 of the unit 202 on the left hand side of the vehicle.

The rear switch arm carried terminals 301 are also disposed between a pair of terminal contacts which are designated 304 and these terminal contacts are secured to the underside of and depend from the switch box cover plate 273 and are insulated therefrom as illustrated. One of these terminal contacts 304 is electrically connected by a conductor 305 with the terminal 241 of the unit 203 on the right side of the vehicle and the other terminal contact 304 is likewise connected by a similar conductor which is designated 305 with the terminal 241 of the units 203 on the left hand side of the vehicle.

It will accordingly be apparent from the foregoing that when the accelerator pedal is swung to the right, for example, a contact 300 and a contact 301 will be brought into electrical connection with a contact terminal 302 and a terminal 304, respectively, and as the switch arm 290 is grounded as indicated at 306, if the switch 263 is closed or "on," current will be passed through the solenoids of the units 202 and 203 to effect the actuation of the valves associated therewith to open the latter so as to establish communication between the pipe lines 253 and 254 and the fluid return lines 234 which carry fluid from the hydraulic units back to the fluid reservoir. Thus both solenoid actuated supply and release valves on the one side, that is the right side, of the vehicle will be opened while the valves on the opposite or left side will remain closed. Obviously by swinging the switch arm 290 toward the left, the reverse operation will occur.

*Cam carried grounding switches*

The four cam carried grounding switches which are numbered 115 for the front switches and 179 for the back or rear switches, are of duplicate construction. Accordingly description will be given of one front switch 115 as illustrated in Figs. 9 and 10, and it will be understood that this will apply to the construction of the rear switches also.

The switch 115 is mounted on one side of the cam rib 111 and for facilitating adjustment of this switch longitudinally of the rib, the rib is provided with two aligned longitudinally extending slots 307.

The switch 115 generally comprises a box 308 which is closed on one side by the cover plate 309 fixed to the perimeter of the side and end walls in a suitable manner as by screws 310. The switch box is disposed upon the inner side of the cam rib 111 and is maintained in spaced relation with the rib by spacers 311 through which extend mounting bolts 312 each of which is secured at one end in the bottom of the box 308 while the other end of each bolt passes through a slot 307 and through plates or washers 313 placed over the slots on opposite sides of the rib and receives on its outer end the securing nut 314. Thus it will be seen that with this arrangement the switch structure can be shifted toward or away from the lower end of the cam on which it is mounted for making slight adjustments whereby to regulate the actuation of the switch in the manner hereinafter described.

Extending tranversely through the switch box 308 and mounted in suitable bearing sleeves 315 and 316 carried respectively by the box cover 309 and the bottom wall of the box, is a short rock shaft 317 one end of which projects beyond the bottom of the switch box into the space between the box and the adjacent rib.

Within the switch box the shaft 317 has fixed thereto between the sleeves 315 and 316 an end of a metal switch blade 318 which carries a contact 319 on its free or outer end which is normally spaced from and adapted, upon the closing of the switch, to make electrical connection with the fixed contact 320 which is mounted upon and insulated from the side wall of the switch box, as indicated at 321. Also attached to the switch blade 318 and connected like the switch blade rigidly with the shaft 317 is a finger 322 which extends in the box longitudinally of and beyond the free end of the switch blade 318 and which has interposed between its free end and the wall of the switch box upon which the terminal or contact 320 is mounted, the compression spring 323. When the shaft 317 is turned in the direction to swing the contact 319 into electrical connection with the fixed terminal 320, this finger 322 places the spring 323 under compression and the spring, therefore, functions to effect the opening of the switch when the force which was applied to the shaft 317 to turn it is released.

The conductor 266 is connected with the terminal 320 of the switch 115 by the conductor 324 located in the switch box and also connected with the terminal 320 is one side of a condenser 325 the other side of which is grounded as indicated at 326. In addition there is connected in parallel with the conductor 324 from the terminal 320 to the terminal 320a, where the wire 266 comes into the box, a resistance heater 324a through which current will pass when the contacts 319 and 320 are closed. This heater is provided for maintaining a slight degree of warmth within the switch box in winter or zero weather, whereby to prevent possible icing of the terminals which might interfere with the action of the circuit and the control of the solenoid actuated supply and release valve structures.

It will be understood, of course, that for the rear switches 179 the conductors 267 will be connected to the terminals 320 of these rear switches in the same manner as described above.

The shaft 317 of the cam carried grounding switch has fixed to the end thereof which projects from the switch box into the area between the switch box and the adjacent cam rib, an end of a curved switch closing trigger 327. This switch closing trigger is extended toward the adjacent free end of the cam and lies along the side of the curved terminal portion 114 of the cam track and, as shown in Fig. 9, projects at its free end slightly beyond the face of the cam track. This trigger 327 is so located as to be engaged by the adjacent flange of the cam follower roller 97, or, in the case of the rear end mechanism, the roller 163, when such roller moves to an extreme position on the cam track and when the trigger is so engaged by the roller the shaft 317 will be turned to close the grounding switch.

*Operation*

The operation of the present invention, when the engine of the motor vehicle in which the mechanism is installed, is running, is determined primarily by the condition of the finger operated switch 263 by which is meant whether this switch is on or off.

For the normal ride condition of the suspension springs the front and rear body support arms 103 and 159 will be disposed, in cooperation with the hydraulic units connected with the upper ends thereof, so that the cam follower rollers 97 and 163 respectively will engage the tracks of their respective cams 110 and 176 approximately midway between the ends of the tracks or at the "neutral" locations designated by the indicator thereon, which indicator for the front cams as shown in Fig. 9 is designated 116. This setting of the mechanism parts will give to the vehicle body the conventional soft ride as the springs will be in expanded condition to have a low rate. Also under these conditions, the vehicle body fenders will be relatively low with respect to the underlying wheels or tires.

Also in the normal ride condition for the suspension mechanism the solenoids for the supply and release valves and the solenoid associated with the pump structure will be de-energized. The supply and release valves will accordingly be open for establishing a fluid connection between the supply nipples 251 and the nipples 252 as illustrated in the left hand portion of Fig. 13, and the by-pass valve associated with the pump will, as shown in Fig. 12, also be open. Under these conditions as the pump is being operated at the same time that the vehicle engine is running, since the pump is operatively coupled with the engine to be operated thereby, the fluid will be idly circulated through the passages 208, 215, 227 and 228, passing through the open by-pass valve.

In order to effect the elevation of the car body above the normal elevation, the operator of the vehicle closes the switch 263 by pressing the "on" button designated 263a. This action will electrically connect the solenoid 211 of the pump and by-pass unit, in circuit, thereby energizing the solenoid and effecting the shifting of the valve sleeve 218 upwardly to the position where the lower skirt portion 222 covers the ports 219. This shuts off the idling circulation of the fluid through the system. When the idling circulation through the pump system or pump unit is thus shut off, the fluid will be forced outwardly through the nipple 214 into the pipeline 259 from which it will pass into the cross-over pipe 258 and from this cross-over pipe fluid will be conducted to the pipes 257 which connect the pairs of solenoid actuated supply and release valves on both sides of the vehicle. From these valves which are in the open condition of the valve shown at the left of Fig. 13, the fluid will be conducted forwardly through the lines 253 into the cylinders of the front hydraulic units and through the lines 254 into the cylinders of the rear hydraulic units.

As the fluid is forced under pressure into the hydraulic unit cylinders, the pistons and cylinders will be forced apart and this action will effect compression of the coil springs associated with the units and will also effect the raising of the vehicle body by applying thrust against the front and rear cams by the cam follower rollers 92 and 163, respectively. Since the cams cannot oscillate and as they are inclined forwardly and downwardly as shown in Figs. 2 and 3, the desired raising of the chassis frame and the body carried thereby will be produced. This elevation of the body will continue until the rollers on the cams are moved to a position at the lower ends of the cams where the flanges of the rollers engage the cam switch triggers 114. The actuation of the cam switch triggers will close the cam switches and this will effect the energization of the solenoids 239 associated with the supply and release valves. When these solenoids 239 are energized the valve spools 244 will be drawn upwardly and communication will be established between the forwardly and rearwardly directed fluid lines 253 and 254 respectively, and the exhaust port nipples 250, permitting the fluid to flow from the hydraulic units back by way of the pipelines 255 between the units, the cross-over pipe 256 and the pipe line 234 to the fluid reservoir 200. Obviously when the fluid flows out of the hydraulic units the separated pistons and cylinders will tend to move together and the cam follower rollers will move back upwardly along the cam tracks until the cam switches are open, whereupon the solenoids 239 of the supply and release valves will be de-energized and the fluid will be again shut off from returning from the hydraulic cylinders and the valves opened to permit the fluid to pass from the pump supply line 259 to the hydraulic cylinders.

Thus as a car is traveling along and inequalities of the roadway cause the front or back running gear on either or both sides of the car to rapidly rise and fall, this movement of the running gear will not be transmitted to the car body as the movement of the running gear will cause the body support arm carried cam follower rollers to shift back and forth on the cams, opening and closing the cam switches and causing a continuous supplying and exhausting of fluid to the hydraulic units in such a way as to absorb the road shocks and to maintain both a longitudinal and transverse horizontal stability of the car body.

It will be seen from the foregoing that another object is accomplished by the present mechanism of providing a spring rate control cam in association with the hydraulic control and spring suspension unit for each vehicle wheel wherein the cam has a surface area for engagement by the body support arm carried follower roller which is contoured so as to establish when the follower roller is therein, a low or near zero body support spring rate, so that when the condition of the road surface is such as to cause rapid up and down movements of a wheel, or to cause what might be termed running gear "dancing," such movements will not be transmitted to the overlying car body. This cam surface area which permits a range of vertical travel of the follower roller extends from the neutral point 116, or slightly above the same, to the upper dotted line location of the roller as shown in Fig. 9, where such upper dotted line position is designated 97a.

The maximum lower position for the rollers on the cam track also shown in dotted lines in this figure, is designated 97b.

It is common experience of car operators that the steering of the motor vehicle becomes more difficult when the driver alone is in the car, particularly if the driver be of considerable weight so as to cause the driver's side of the car to be lowered. With the present invention, under such circumstances, if the car body is in the described elevated condition, the steering geometry of the vehicle will not be affected because of the fact that when the driver enters the car, causing his side of the car to be depressed, the body support arm carried follower roller 97 at the left front side of the car will be moved away from the cam switch trigger 114, permitting the switch to open, which will effect de-energization of the associated solenoid 239 so that the spring 248 of the associated valve unit will shift the valve spool 244 downwardly. Thus the exhaust port nipple 250 will be closed and the pump supply line 259 will be put back into communication with the pipe line 253 and the pump will then force fluid into the front left hydraulic cylinder continuously until that side of the vehicle body at the front is restored by lifting to its normal or previous elevated condition, thus bringing the entire body to the desired level. Obviously if two persons enter the front of the vehicle causing the front end to go down, this action will be repeated for both of the front cam switches, that is, the switches will be opened and the fluid will be forced into the front hydraulic cylinders until the entire front end is restored to its previous elevation.

In the operation of the vehicle along a road where there is a continuous up and down movement at each of the cams, as the cam switches are opened and closed, the presence of the condensers will cause a momentary holding of the energization of the solenoids for the respective supply and release valves.

In addition to the foregoing, when the mechanism is operated in winter or in freezing weather, the continuously opening and closing cam switches will cause current to pass through the heater coils 324a and thus maintain a degree of warmth in the switch boxes which will prevent formation of ice on the switch points which would interfere with the desired operation of the mechanism.

As will be understood from the foregoing description of the mechanism, the solenoid actuated supply and release valves are also readily controlled by the vehicle operator through the medium of the accelerator actuated switch mechanism. By this accelerator switch mechanism the operator is able to effect the simultaneous energization of the solenoids of either pair of solenoid actuated supply and release valves independently of or regardless of the condition of the associated cam switches, whereby to produce the lowering of one side of the vehicle body.

The action of lowering one side of the vehicle body is desirable to maintain proper steering geometry in the passage of the vehicle around a curve and by the present mechanism the operator can counteract the effect of centrifugal force to obtain and maintain this condition.

It will be apparent from the foregoing that in order to improve the steering of the vehicle the operator, upon approaching a curve, will swing the accelerator pedal laterally in the direction which the vehicle is to be steered. For example, if the vehicle is to be steered to the right around a curve, the operator will swing the accelerator pedal to the right, thus moving the switch arm 290 in the same direction and effecting the engagement of the right hand contacts 300 and 301 with the adjacent contacts 302 and 304. This will energize the solenoids for both supply and release valve units on the right hand side of the vehicle and will close off communication between the hydraulic units on that side and the pump supply line and will open the exhaust line to cause the fluid to pass from the hydraulic units on the right side back through the return line leading to the reservoir. Obviously, therefore, as the vehicle rounds the curve to the right, the right side of the vehicle body which would normally tend to rise, will be lowered and thus a steering condition will be established similar to the action of a bicycle rider leaning to the right when rounding a curve to the right and there will be no opposing force to the easy steering of the vehicle.

It will, of course, be apparent that after completing the turn the vehicle operator may, by applying the necessary force to the accelerator pedal, return the switch arm 290 to the central position or by releasing his pressure against the accelerator pedal, the spring 299, which was under compression, will react to return the switch arm to the centralized position to open the switch. Upon this occurring, the solenoids for the supply and release valves which had been actuated, will be de-energized and the springs 248 thereof will return the valve spools 244 to their former valve open condition to re-establish communication between the affected hydraulic units and the pump supply line. The units will thus receive the necessary additional fluid to bring the previously lowered side of the vehicle back to its elevated and level condition.

In the pump and by-pass unit there is provided the pressure relief means in the form of the spring pressed valve 231. This valve is maintained in closed position by its control spring under normal operating conditions of the system. If, however, for any reason the pressure builds up excessively, then this pressure will be transmitted by the fluid entering the cross-over passage 229 and forcing the valve 231 from its seat so as to permit the fluid to escape back through the passage 227 to the reservoir or to the passage 228 leading to the pump intake. The adjustment screw 232 permits the tension of the spring to be increased or decreased against the valve 231 so that the opening pressure of the valve can be very nicely regulated.

If after the vehicle body has been operated in the elevated condition, it is desired to lower it for operation at the normal elevation, this lowering is effected as follows:

The ignition switch for the motor vehicle engine is first turned off, which action, of course, stops the operation of the pump 204. With the main control switch 263 still in the closed or "on" condition, the ignition switch is again turned on, but the vehicle engine is not started. The foot accelerator switch is then actuated to first close the contacts on one side, which will result in the energization of the solenoids for the supply and release valves on that side and this will put the hydraulic units on that side in communication with the fluid return pipe lines 255, 256 and 234. The weight of the vehicle and the effect of gravity will thus cause the pistons and cylinders of the hydraulic units to come together and force the fluid into the return line. After the one side has been restored to fully lowered condition, the accelerator switch arm is swung to the opposite side to close the contacts on that side and energize the solenoids for the supply and release valves on that side so that the action will there be repeated of establishing communication between the hydraulic units and the fluid return lines, thus effecting the lowering of the other side of the vehicle. Following the lowering of the vehicle in this manner, the control switch "off" button 263b will be pressed to open this switch. Consequently with the switch 263 open, the engine may then be started up and the car may be operated with the body in the lowered condition. The pump will, of course, be operated at all times that the engine is operating, but with the switch 263 off, the pump idling by-pass valve will be open and the fluid will then merely be circulated idly as hereinbefore described.

In driving a motor vehicle along a roadway where there is a relatively steep lateral incline of the road surface, there are two ways in which the body of the vehicle when equipped with the mechanism of the present invention, may be held to a level riding condition.

One way in which the level of the vehicle body might be maintained would be by repeated use of the accelerator switch. If, for example, the operator desired to keep the car level in this manner, by repeatedly opening and closing the switch controlled by the accelerator pedal, such opening and closing of the switch would be confined to one side only so as to produce a lowering of the side of the vehicle which would be at the high side of the road.

Another way in which the level of the vehicle body could be maintained in such a situation would be as follows:

Considering, for example, that the left side of the car is on the high side of the road, the operator will carefully lower the high side of the car by employing the accelerator switch in the manner previously stated, and when the car reaches the desired level state, then the "off" button of the control switch 263 is pressed by the operator so as to cut out or deenergize the solenoids associated with the pump and the pressure release valves. Thus all of the valves will remain in the position which they assumed in the operation of lowering the high side of the car and also the hydraulic units will remain in the position which they were in when this operation was performed. Since the pump solenoid has been deenergized, the by-pass valve in the pump will be opened and the fluid will be idly circulated through the by-pass passages instead of being forced by the pump into the fluid system. When the driver again desires to set the car body for the buoyant ride state upon reaching a level road surface, this is accomplished by pressing the "on" button of the control switch 263 so as to again energize the pump solenoid and permit the pump to force fluid into the system until the desired level riding state is reached.

From the foregoing, it will be seen that the mechanism herein disclosed provides a control means over the movements of the vehicle body such as to either automatically maintain a desired level ride condition or to enable the vehicle operator to effect the lateral tilting of the vehicle body if and when desired, to maintain such level ride condition, and also that by the maintenance of such ride conditions no contrary motions are imparted to the running gear which interfere with or make difficult the steering of the vehicle, but on the contrary the steering is made easier at all times and under all conditions.

I claim:

1. In a motor vehicle, a chassis frame, rear wheel running gear, resilient suspension means between said gear and the frame, steerable front wheel running gear, resilient suspension means between the steerable front wheel running gear and the frame, means for effecting elevation of the chassis frame relative to said rear wheel and steerable front wheel running gear, to increase the jounce spacing between the wheels and body members on the frame, and means actuatable by and simultaneously with the motor vehicle foot accelerator for modifying the action of the elevation effecting means to selectively produce lowering of the chassis frame on either side thereof.

2. The invention according to claim 1, wherein the resilient suspension means for the front and rear of the vehicle comprises coil springs disposed with their long axes directed longitudinally of the chassis frame and said elevation effecting means when active acting to change the rate of the springs.

3. In a motor vehicle, a chassis frame, steerable front wheels operatively coupled with the frame, an upwardly and rearwardly arching structure at each side of the frame having a forward portion coupled to the front end of the frame, supporting means between the rear end of each structure and the frame, a transversely directed jack shaft carried by each structure adjacent to the rear thereof, upstanding and depending thrust levers carried by each jack shaft, an upright body support arm supported by each steerable front wheel, a stationary inclined thrust cam supported by each structure above and operatively engaged by an upper part of the adjacent support arm, a thrust coupling between each depending thrust lever and the support arm, a resilient suspension means operatively coupled between each upstanding thrust lever and the adjacent structure, rear wheel running gear, and resilient suspension means between the rear wheel running gear and the chassis frame.

4. The invention according to claim 3, with means for effecting a reduction of the rate of the front and rear resilient suspension means and elevating the chassis frame and parts carried thereby relative to the front and rear wheel running gear.

5. The invention according to claim 4, wherein the last named means embodies a fluid system having therein: a fluid power unit for each resilient suspension means, a fluid pump, valve means controlling the flow of fluid from the pump to the power units and return and electrical means adapted to actuate the valve means to exhaust fluid from the power units at a predetermined elevation of the chassis frame.

6. The invention according to claim 3, wherein the upstanding and depending thrust arms of each jack shaft lie in horizontally spaced vertical planes.

7. The invention according to claim 3, wherein the resilient suspension means at the front and rear of the chassis embodies a coil spring disposed with its longitudinal axis extending longitudinally of the chassis frame and the rear resilient suspension means being at a lower elevation than and inset with respect to the front resilient suspension means.

8. The invention according to claim 3, wherein the rear wheel resilient suspension means embodies a longitudinal body supporting auxiliary frame overlying the rear portion of each side of the chassis frame, a rear body supporting arm mounted on and upstanding from a part of the rear wheel running gear, a stationary inclined thrust cam attached to and extending at an inclination downwardly from said auxiliary frame over the rear body supporting arm and a sliding connection between the last named support arm and the overlying cam.

9. In a motor vehicle, a chassis frame, rear wheel running gear, steerable front wheel running gear operatively coupled with the chassis, an upright front body support arm supported by each front wheel, an upright rear body support arm on the rear wheel running gear at each side of the chassis, a spring suspension means adjacent to each rear body support arm and embodying a coil compression spring disposed to extend longitudinally of the chassis frame and interposed between and operatively coupled to the chassis frame and the adjacent support arm, a spring suspension means adjacent to each front body support arm and embodying a coil compression spring disposed to extend longitudinally of the chassis frame and interposed between and operatively coupled to the chassis frame and the adjacent support arm, a load carrying cam supported by the chassis frame above each support arm, the said operative coupling between each rear body support arm and the adjacent spring including a follower element movably engaging the overlying cam, and the operative coupling between each front body support arm and the adjacent spring embodying a pair of rock levers secured to a common shaft, a coupling between an end of one adjacent spring, a coupling between the other lever and the adjacent body support arm and a follower element engaging the overlying cam.

10. In a motor vehicle, a chassis frame, rear wheel running gear, steerable front wheel running gear, mechanism operatively coupling the front wheel running gear with the front end of the chassis frame whereby the front wheels and chassis frame have relative up-and-down movement, mechanism operatively coupling the rear wheel running gear and chassis frame for relative up-and-down movement, said mechanisms including suspension springs, a fluid pressure system including fluid operated power units for effecting the raising and lowering of the chassis frame relative to the front and rear wheel running gear, said system further including a fluid pump and conduits for conveying fluid from one side of the pump to said units and back from the units to the other side of the pump, a two-way control valve between the pump and each unit and having a first position for passing fluid from the pump to the associated unit and a second position for returning fluid from the associated unit back to the pump, means for actuating each valve to the first position, electrical means for actuating each valve to the second position, a separate means for each unit for energizing the electrical means of the respective valve upon elevation to a predetermined height of the portion of the chassis frame adjacent thereto, and means for selectively simultaneously energizing the electrical means for the valves associated with power units for the front and rear wheel running gear on either side of the chassis.

11. The invention according to claim 10, with a foot accelerator vehicle engine control, and means operatively connected with and actuated by said control for selectively simultaneously energizing the electrical means for the valves associated with power units for the front and rear wheel running gear on either side of the chassis.

12. The invention according to claim 10, with a vehicle engine foot accelerator pedal, means supporting the pedal for rocking movement in a vertical plane and for turning on an axis perpendicular to said plane, and an electric circuit control means operatively connected with said supporting means for selectively simultaneously effecting energization of the electrical means for the valves associated with power units for the front and rear running gear on either side of the chassis.

13. In a motor vehicle, a chassis frame, rear wheel running gear, steerable front wheel running gear, mechanism operatively coupling the front wheel running gear with the front end of the chassis frame whereby the front wheels and chassis frame have relative up-and-down movement, mechanism operatively coupling the rear wheel running gear and chassis frame for relative up-and-down movement, said mechanisms each including; an upright body support arm carried by the adjacent running gear, an inclined cam track carried by the chassis and overlying the top end of the adjacent support arm, a suspension spring interposed between a part fixed to the chassis and the upper end of an arm, a cam follower supported on the top end of each arm and riding on the overlying cam track and a fluid operated elongatable power unit operatively connected at one end to and for fulcrum against said part fixed to the chassis and operatively coupled at its other end with said arm for imposing thrust against the latter, a fluid system including a pump having an intake and outlet, a fluid reservoir connected with said intake, conduits for conveying fluid from the pump outlet to the power units, a pair of electric solenoid valves for each side of the vehicle and for the respective side front and rear power units, each pair of valves having therebetween a fluid supply coupling conduit and a fluid return conduit, each of said valves having a first and second operating position and each valve when in first operating position passing fluid to its respective adjacent power unit to elongate the latter and when in second operating position passing fluid away from its respective power unit to shorten the latter, said units when elongated compressing their respective springs and elevating the vehicle body, each solenoid valve when energized being actuated to its second operating position, means adjacent to each vehicle wheel for energizing one solenoid valve only of an adjacent pair upon the raising of the vehicle body to a certain elevation above the running gear, and means for effecting selective simultaneous energization of either pairs of solenoid valves.

14. The invention according to claim 13, wherein the penultimate means comprises an electric circuit maker and breaker supported adjacent to each cam track and adapted to be engaged by the cam follower to make the circuit to the respective solenoid valve upon movement of the cam follower to one position on the cam track.

15. The invention according to claim 14, wherein the circuit maker and breaker is supported for adjustment in the direction of movement of the cam follower whereby the extent of elevation of the vehicle body by the power units may be regulated by advancing or retarding the closing of the circuit.

16. The invention according to claim 13, wherein the penultimate means comprises an electric circuit maker and breaker secured to each cam track and having a trigger element in position to be engaged by the cam follower to make the circuit to the respective solenoid valve upon movement of the cam follower to a position on the lower end of the cam track.

17. The invention according to claim 16, wherein the circuit maker and breaker is supported for adjustment of its position on and longitudinally of the cam track whereby the elevation of the vehicle body by the power units may be regulated by advancing or retarding the making or the closing of the circuit.

18. The invention according to claim 13, wherein the last means comprises an operator actuated circuit maker and breaker having a circuit open position and two circuit closed positions, the circuit maker and breaker in each of its closed positions making a circuit for and energizing one pair only of the solenoid controlled valves.

19. The invention according to claim 13, wherein the last means comprises a foot operated circuit maker and breaker embodying a pivoted foot pedal adapted to be swung laterally in opposite directions from a central position, a switch arm having a central position and coupled to the pedal to be swung therewith to either of two lateral circuit closing positions, the switch arm when in each circuit closing position making a circuit for and energizing one pair only of the solenoid controlled valves.

20. The invention according to claim 13, with means for establishing a driving connection between said pump and an engine for the motor vehicle, a conduit forming a fluid by-pass circuit connected with the pump intake and outlet, an open solenoid valve in said by-pass circuit, and electric switch means for electrically cutting said solenoid valve into and out of the circuit of the electrical system for the motor vehicle for selectively opening or closing the valve.

21. In a motor vehicle, a chassis frame embodying longitudinal side beams having inset front end portions, a transverse front end beam structure connecting the side beams and extending laterally beyond said inset portions, upstanding body support posts carried by said side beams at the rear ends of said inset portions, a transverse body support beam carried by said posts, steerable front wheel running gear mechanism operatively connected with said front end beam structure on the outer sides of the side beams, rear wheel running gear, upwardly and rearwardly arching inner rails each adjacent to and on the outer side of a front end portion of the chassis and each secured at its forward end to the front end beam structure and secured at its rear end to the transverse body support beam, an outer fender rail adjacent to and arching upwardly and rearwardly in spaced relation with an inner rail, said fender rails each being secured at its forward and rear ends respectively to the front end beam structure and the transverse body support beam, a jack shaft adjacent to and parallel with each end of the body support beam, means supporting each jack shaft beneath the adjacent inner and outer rails, an upstanding crank arm secured to each jack shaft adjacent to its outer end, a depending crank arm secured to each jack shaft adjacent to its inner end, a substantially horizontal extensible fluid power unit located below each pair of inner and outer rails, each unit comprising three telescopically assembled elements, one element forming a guide cylinder and having an outer end attached to the adjacent upstanding crank arm, a second element forming a piston and having an outer end secured to the adjacent pair of inner and outer rails and the third element forming a free sliding piston cylinder having the piston entering one end and having its other end closed and slidably mounted in said guide cylinder, a coil spring encircling each power unit and secured at its ends to the guide cylinder and the piston cylinder, means for introducing fluid under pressure into the piston cylinder between the said closed end thereof and the piston, an upstanding body support arm supported upon each steerable front wheel running gear mechanism, an elongate cam track member secured at one end to the underside of each inner arched rail and extending downwardly and forwardly over each support arm, a thrust link connected between each depending crank arm and the adjacent body support arm, a cam track engaging follower at the top of each support arm, said fluid power units upon extension by fluid entering under pressure into the piston cylinder applying thrust to the cam track member to elevate the chassis frame wtih respect to the running gear, and elevating mechanism between the chassis frame and said rear wheel running gear.

22. The invention according to claim 21, wherein the rear wheel running gear includes conventional rear axle housing, said chassis side beams extending a substantial distance rearwardly beyond the axle housing, said last named mechanism including a pair of upstanding body support arms carried by the rear axle housing, a cam follower upon the upper end of each of the last named arms, an elongate cam track member for each last named follower, means supporting each of the last named cam track members from one end above and in downwardly and forwardly inclined position over and in engagement with a follower, an upstanding anchor post upon each side and at the rear of the chassis frame, and a combined suspension spring and fluid power elevating unit connected with and between each anchor post and the upper end of the adjacent arm.

23. The invention according to claim 22, wherein the said means supporting each of the last named cam track members comprises an elongate rail secured at one end to the adjacent side beam of the chassis forwardly of the axle housing and arching upwardly and rearwardly and secured at its rear end to the adjacent anchor post, and a body support post rising from each side beam between the ends of the adjacent elongate rail and secured at its top end to such rail.

24. The invention according to claim 22, wherein the unit connection with the anchor post is adjustable whereby the overall length of the unit may be changed.

25. In a motor vehicle, a chassis frame, steerable front wheels operatively coupled with the frame, structure means at each side of the frame having a forward portion coupled to the front end of the frame, a supporting means between the rear end of each structure means and the frame, a shaft carried by each structure means adjacent to the rear thereof, a pair of levers carried by each shaft, body support means supported by each steerable front wheel, cam means supported by each structure and operatively engaged by a part of the adjacent body support means, coupling means between one of said levers and the support means, a resilient suspension means operatively coupled between the other lever and the adjacent structure, rear wheel running gear, and resilient suspension means between the rear wheel running gear and the chassis frame.

26. The invention according to claim 25, with means for effecting a reduction of the rate of the front and rear resilient suspension means and elevating the chassis frame and parts carried thereby relative to the front and rear wheel running gear.

27. The invention according to claim 26, wherein the last named means embodies a fluid system having therein; a fluid power unit for each resilient suspension means, a fluid pump, valve means controlling the flow of fluid from the pump to the power units and return and electrical means adapted to actuate the valve means to exhaust fluid from the power units at a predetermined elevation of the chassis frame.

28. The invention according to claim 25, wherein the said levers of each shaft lie in horizontally spaced vertical planes.

29. The invention according to claim 25, wherein the resilent suspension means at the front and rear of the chassis embodies a coil spring disposed with its longitudinal axis extending longitudinally of the chassis frame and the rear resilient suspension means being at a lower elevation than and inset with respect to the front resilient suspension means.

References Cited in the file of this patent

UNITED STATES PATENTS

| | | |
|---|---|---|
| 2,018,427 | Taber | Oct. 22, 1935 |
| 2,443,433 | Sanmori | June 15, 1948 |
| 2,762,633 | Gouirand | Sept. 11, 1956 |
| 2,809,051 | Jackson | Oct. 8, 1957 |
| 2,882,069 | Faiver | Apr. 14, 1959 |
| 2,895,743 | Jackson | July 21, 1959 |

FOREIGN PATENTS

| | | |
|---|---|---|
| 518,848 | Great Britain | Mar. 8, 1940 |